United States Patent
Yoshima et al.

(10) Patent No.: US 11,362,366 B2
(45) Date of Patent: Jun. 14, 2022

(54) SECONDARY BATTERY COMPOSITE ELECTROLYTE, SECONDARY BATTERY, AND BATTERY PACK

(71) Applicant: Kabushiki Kaisha Toshiba, Minato-ku (JP)

(72) Inventors: Kazuomi Yoshima, Koto (JP); Yasuhiro Harada, Isehara (JP); Norio Takami, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 190 days.

(21) Appl. No.: 15/688,215

(22) Filed: Aug. 28, 2017

(65) Prior Publication Data
US 2017/0358825 A1    Dec. 14, 2017

Related U.S. Application Data

(63) Continuation of application No. PCT/JP2015/076473, filed on Sep. 17, 2015.

(51) Int. Cl.
*H01M 10/0565* (2010.01)
*H01M 10/056* (2010.01)
(Continued)

(52) U.S. Cl.
CPC ..... *H01M 10/0565* (2013.01); *H01M 10/056* (2013.01); *H01M 10/0525* (2013.01);
(Continued)

(58) Field of Classification Search
None
See application file for complete search history.

(56) References Cited

U.S. PATENT DOCUMENTS 6,485,622 B1 * 11/2002 Fu ............................ C03C 4/18
                                                        204/421
2008/0268346 A1    10/2008 Inda
(Continued)

FOREIGN PATENT DOCUMENTS

CN       103515649 A      1/2014
JP       2002-541633     12/2002
(Continued)

OTHER PUBLICATIONS

Yi, Xin et al. "Effective enhancement of electrochemical performance for spherical spinel LiMn2O4 via Li ion conductive Li2ZrO3 coating", Electrochimica Acta, vol. 134, pp. 143-149. (Year: 2014).*

(Continued)

*Primary Examiner* — Jonathan Crepeau
(74) *Attorney, Agent, or Firm* — Oblon, McClelland, Maier & Neustadt, L.L.P.

(57) ABSTRACT

The present invention is provided to reduce the influence of expansion and contraction of an active material, form a favorable interface between the solid electrolyte and the active material, and increase ion conductivity in the electrolyte, thereby obtaining a wide operation temperature range. A secondary battery composite electrolyte includes an inorganic compound having an Li ion conductivity at room temperature that is $1 \times 10^{-10}$ S/cm or more and having particle diameter of 0.05 μm or more and less than 8 μm, and an organic electrolyte. The weight ratio between the organic electrolyte and the inorganic compound is 0.1% or more and 20% or less.

10 Claims, 16 Drawing Sheets

(51) Int. Cl.
  *H01M 10/0585* (2010.01)
  *H01M 10/0525* (2010.01)
  *H01M 4/485* (2010.01)
  *H01M 4/58* (2010.01)

(52) U.S. Cl.
  CPC ........ *H01M 10/0585* (2013.01); *H01M 4/485* (2013.01); *H01M 4/5825* (2013.01); *H01M 2300/0017* (2013.01); *H01M 2300/0071* (2013.01); *H01M 2300/0088* (2013.01); *H01M 2300/0091* (2013.01); *Y02T 10/70* (2013.01)

(56) References Cited

U.S. PATENT DOCUMENTS

| | | |
|---|---|---|
| 2013/0230778 A1 | 9/2013 | Saimen et al. |
| 2014/0227614 A1 | 8/2014 | Lee et al. |
| 2014/0302399 A1 | 10/2014 | Saimen et al. |
| 2016/0218349 A1* | 7/2016 | Hasegawa ............... H01M 4/62 |

FOREIGN PATENT DOCUMENTS

| | | |
|---|---|---|
| JP | 2003-331912 | 11/2003 |
| JP | 3724960 | 12/2005 |
| JP | 2006-86102 | 3/2006 |
| JP | 2012-230810 | 11/2012 |
| JP | 5082197 | 11/2012 |
| JP | 5413090 | 2/2014 |
| JP | 2014-203595 | 10/2014 |
| JP | 2014-212103 | 11/2014 |
| JP | 2015-88479 A | 5/2015 |
| WO | WO 00/60684 | 10/2000 |
| WO | WO 2014/051032 A1 | 4/2014 |

OTHER PUBLICATIONS

International Search Report dated Dec. 22, 2015 in PCT/JP2015/076473, filed on Sep. 17, 2015 (with English Translation).
Written Opinion dated Dec. 22, 2015 in PCT/JP2015/076473, filed on Sep. 17, 2015.
I. M. Hodge et al., "Impedance and Modulus Spectroscopy of Polycrystalline Solid Electrolytes," Journal of Electroanalytical Chemistry, 74, 1976, 10 pages.
B. Roling, "What do electrical conductivity and electrical modulus spectra tell US about the mechanisms of ion transport processes in melts, glasses, and crystals?," Journal of Non-Crystalline Solids, 244, 1999, 10 pages.
Yun-Chae Jung et al., "All Solid-State Lithium Batteries Assembled with Hybrid Solid Electrolytes", Journal of The Electrochemical Society, 162, (2015), A704-A-710.
Yun-Chae Jung et al., "Ceramic separators based on $Li^+$-conducting inorganic electrolyte for high-performance lithium-ion batteries with enhanced safety", Journal of Power Sources, 293, 2015, 675-683.

* cited by examiner

SECONDARY BATTERY COMPOSITE ELECTROLYTE, SECONDARY BATTERY, AND BATTERY PACK

FIELD

Embodiments described herein relates to a secondary battery composite electrolyte, a secondary battery using the same, and a battery pack.

BACKGROUND

In recent years, research and development of nonaqueous electrolyte batteries, for example, lithium (Li) ion secondary batteries as high energy density batteries, has been actively conducted. Nonaqueous electrolyte batteries are expected to be used as power supplies for hybrid vehicles and hybrid electric vehicles, and uninterruptible power supplies for mobile phone base stations. In particular, as automotive batteries, all-solid Li ion secondary batteries have been actively studied and their high safety has been focused upon.

Since all-solid Li ion secondary batteries use solid electrolytes, they have no risk of ignition compared to Li ion secondary batteries using nonaqueous electrolytes. However, high capacity all-solid Li ion secondary batteries have not yet been realized. One reason for this is an interface between a solid electrolyte and an active material of an electrode. Both of the solid electrolyte and the active material are solid, and the two relatively easily adhere to each other if heat is applied. However, since the active material expands and contracts according to insertion and removal of Li, when charging and discharging are repeated, the active material may separate from the solid electrolyte, and the charging and discharging cycle may not be satisfactorily performed. Therefore, in the solid electrolyte, it is necessary to reduce the influence of expansion and contraction of the active material and form a favorable interface between the solid electrolyte and the active material. In addition, it is necessary for a battery to operate in a wider operation temperature range.

DESCRIPTION OF EMBODIMENTS

Figure 1:
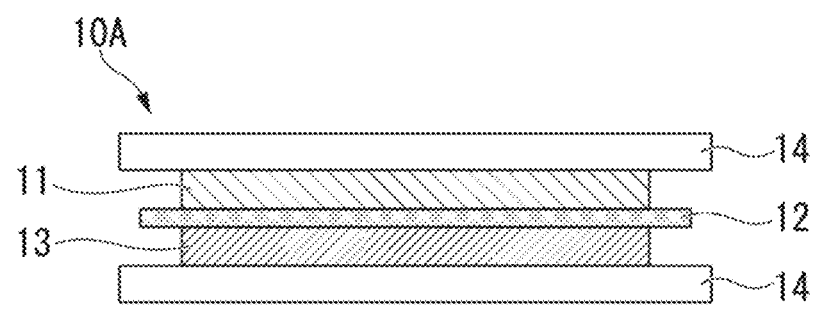
FIG. 1 is a schematic side view showing an electrode body of a second embodiment.

A secondary battery composite electrolyte of an embodiment will be described below with reference to the drawings.

Here, the same configurations throughout the embodiment are denoted with the same reference numerals and repeated descriptions will be omitted. In addition, the drawings are schematic in order to describe the invention and facilitate understanding thereof, and shapes, sizes, proportions, and the like of components are different from those of an actual device, and these can be appropriately changed in design with reference to the following description and known techniques.

First Embodiment

A secondary battery composite electrolyte according to a first embodiment includes an inorganic compound and an organic electrolyte. In the present embodiment, the inorganic compound forms inorganic solid particles. The inorganic solid particles and the organic electrolyte form the secondary battery composite electrolyte.

In the present embodiment, inorganic solid particles are used as the inorganic compound. Here, the inorganic solid particles are inorganic compound particles having a certain average particle diameter to be described below. Furthermore, the inorganic solid particles are preferably non-Li ion conductive inorganic solid particles which have non-Li ion conductivity. In the present embodiment, non-Li ion conductivity refers to Li ion conductivity at 25° C. that is less than $1 \times 10^{-10}$ S/cm. Non-Li ion conductive inorganic solid particles have high electrochemical stability because movement of Li due to polarization does not occur, and particularly, have excellent stability at a high temperature. Accordingly, it is possible to improve lifespan characteristics of a battery using the present electrolyte.

Figure 8:
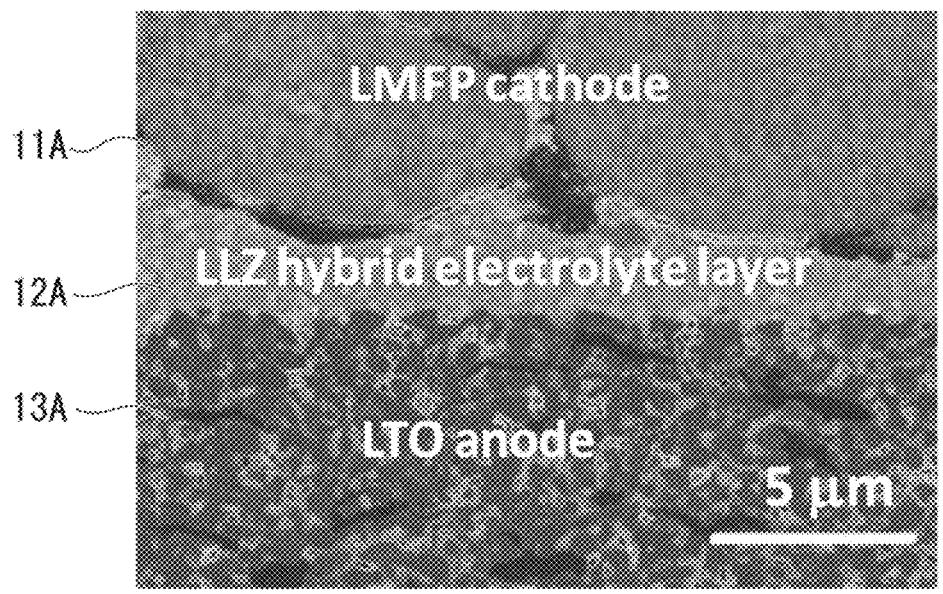
FIG. 8 is a partial SEM image of an electrode body of Example 1.
Figure 21:
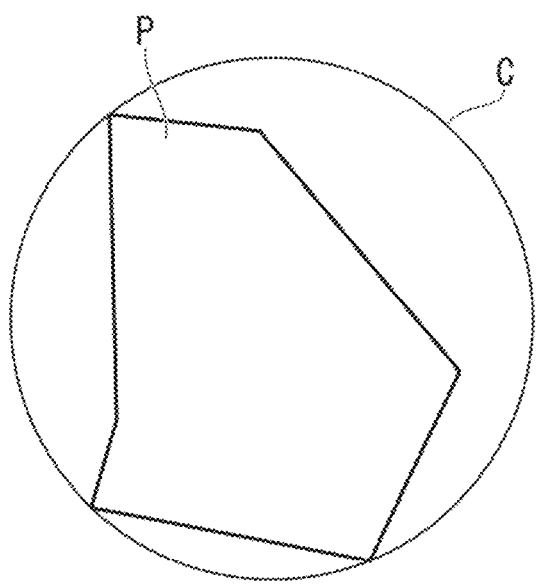
FIG. 21 is a schematic diagram showing a method of measuring an average particle diameter.

The inorganic compound used for non-Li ion conductive inorganic solid particles is not particularly limited. However, in consideration of high reduction resistance and low costs, an aluminum oxide, a zirconium oxide, a silicon oxide, and a magnesium oxide are preferable. In addition, when a metal oxide such as a titanium oxide, a niobium oxide, a tantalum oxide, a hafnium oxide, an yttrium oxide, a gallium oxide, and a germanium oxide or a lanthanide oxide such as a lanthanum oxide is used, the same effect can be obtained. A preferable particle size (average particle diameter) of non-Li ion conductive inorganic solid particles is 0.01 µm to 10 µm. Furthermore, the particle size of non-Li ion conductive inorganic solid particles is more preferably 0.01 µm to 8 µm. Here, the particle size can be determined by a laser diffraction method when there are only isolated nonionic conductive inorganic solid particles. On the other hand, when nonionic conductive inorganic solid particles are included in an electrolyte of a battery, the particle diameter can be determined when particles are observed while an electrode material and a nonionic conductive inorganic solid material are distinguished through a scanning electron microscope (SEM) and energy dispersive X-ray spectroscopy. In this case, an electrode-coated surface is cut along the diagonal line without destroying an organizational structure using focused ion beam (FIB), and observation is performed on both ends along the cut surface under SEM. In this case, particles of the nonionic conductive inorganic solid material are randomly observed, and measurement is performed at at least 100 points to calculate an average valve. Here, the particle diameter can be determined as follows. FIG. 8 is an image obtained when a cross section of an electrode body laminate of a positive electrode/electrolyte/negative electrode is cut along the diagonal line of the electrode using FIB and the cut cross section is observed under SEM. In FIG. 8, 11A indicates the positive electrode, 12A indicates the composite electrolyte, and 13A indicates the negative electrode. As shown in FIG. 8, when the cross section of the electrode is observed in the SEM image, as shown in the schematic diagram showing a method of measuring an average particle diameter shown in FIG. 21, among circles (that is, circumscribed circles) surrounding a particle, a circle C (called the smallest circumscribed circle) with the smallest diameter is drawn. The diameter of the smallest circumscribed circle is defined as the particle diameter.

On the other hand, since inorganic solid particles having a garnet type structure have advantages such as high Li ion conductivity, high reduction resistance, and a wide electrochemical window, they are preferably used as inorganic solid particles having Li ion conductivity. Examples of the inorganic solid particles having a garnet type structure include $La_{5+x}A_xLa_{3-x}M_2O_{12}$ (A denotes Ca, Sr, or Ba, and M denotes Nb or Ta), $Li_3M_{2-x}L_2O_{12}$ (M denotes Ta or Nb, and L denotes Zr), and $Li_{7-3-x}Al_xLa_3Zr_3O_{12}$, $Li_7La_3Zr_2O_{12}$. Among them, since $Li_{6.25}Al_{0.25}La_3Zr_3O_{12}$ and $Li_7La_3Zr_2O_{12}$ have high Li ion conductivity (ion conductivity) and are electrochemically stable, discharge performance and cycle lifespan performance are excellent, and even if they are formed into fine particles, they are chemically stable with respect to the organic solvent, which is advantageous. x is preferably in a range of 0 to 0.5.

In the present embodiment, when Li ion conductive inorganic compound particles having a Li ion conductivity of $1\times10^{-10}$ S/cm or more at 25° C. are used, it is possible to increase the Li ion concentration at the contact interface when they are combined with an organic electrolyte. In the Li ion conductive inorganic compound, Li ions can freely move due to an external electric field. When the Li ion conductive inorganic compound is arranged as an electrolyte between the positive electrode and the negative electrode, polarization is generated at the contact interface between the inorganic compound and the organic electrolyte due to a potential difference between the positive electrode and the negative electrode. In this case, since Li ions collect on the surface of the Li ion conductive inorganic compound due to the polarization, a part in which the Li ion concentration is high is generated.

In the present embodiment, the organic electrolyte includes Li (lithium) ions exhibiting ion conductivity and at least one selected from among propylene carbonate, ethylene carbonate, diethyl carbonate, and methyl ethyl carbonate. Here, when sulfide solid electrolyte particles having high Li ion conductivity are used in the organic electrolyte, it is not preferable because a sulfur component dissolves.

In the present embodiment, the weight ratio between the organic electrolyte and the inorganic compound is 0.1% or more and 20% or less. In other words, the amount of the organic electrolyte is 0.1 to 20 parts by mass when there is 100 parts by mass of the inorganic compound. The weight ratio between the organic electrolyte and the inorganic compound is preferably 1% or more and 10% or less and particularly preferably about 4%.

In addition, when the Li ion concentration at the contact interface between the inorganic compound and the organic electrolyte is set as $C_{Li(surface)}$, the lithium ion concentration at the center of particles in the inorganic compound is set as $C_{Li(bulk)}$, and the Li ion concentration in the organic electrolyte is set as $C_{Li(organic)}$, it is preferable that $C_{Li(surface)} > C_{Li(organic)} \geq C_{Li(bulk)}$ be satisfied. In such a configuration, an Li ion conduction path through which Li ions easily move is formed on the surface of the inorganic compound, a favorable interface is formed between the solid electrolyte and the active material, and high temperature durability and the cycle lifespan of the battery can be improved.

A concentration distribution in the solid electrolyte can be quantified by in-situ measurement using Rutherford backscattering spectrometry (RBS) and nuclear reaction analysis (NRA) in combination. A gold (Au) electrode is deposited on both surfaces of an electrolyte layer formed by combining the inorganic compound and the organic electrolyte, and RBS/and NRA measurement is performed while a voltage of 5 V is applied between both electrodes. The Li ion concentration $C_{Li(surface)}$ on the surface of the inorganic compound in the electrolyte layer, the Li ion concentration $C_{Li(bulk)}$ in the inorganic compound, and the Li ion concentration $C_{Li(organic)}$ in the organic electrolyte away from the inorganic compound are measured and compared.

Furthermore, in the secondary battery composite electrolyte of the present embodiment, when the peak frequency of a complex modulus spectrum represented by the following Equation (1) is set as $\omega_{max}$, it is preferable that the relationship between $\omega_{max\text{-}hybrid}$ of the secondary battery composite electrolyte, $\omega_{max\text{-}organic}$ of the inorganic compound included in the secondary battery composite electrolyte, and $\omega_{max\text{-}organic}$ of the organic electrolyte included in the secondary battery composite electrolyte satisfy $\omega_{max\text{-}hybrid} > \omega_{max\text{-}organic}$.

$$\hat{M}(\omega) = i\omega \in_0 \hat{Z}(\omega)/k(1) \qquad [\text{Math. 1}]$$

Here, measurement of a complex modulus spectrum of the secondary battery composite electrolyte will be described. In order to define the Li ion concentration in the electrolyte, a measurement method using a modulus spectrum is performed. The modulus spectrum reflects charge transfer. In this case, it is possible to estimate the density of the mobile Li ion concentration. Details of the equation such as the parameters thereof are described in Non Patent Document 1.

Figure 20:
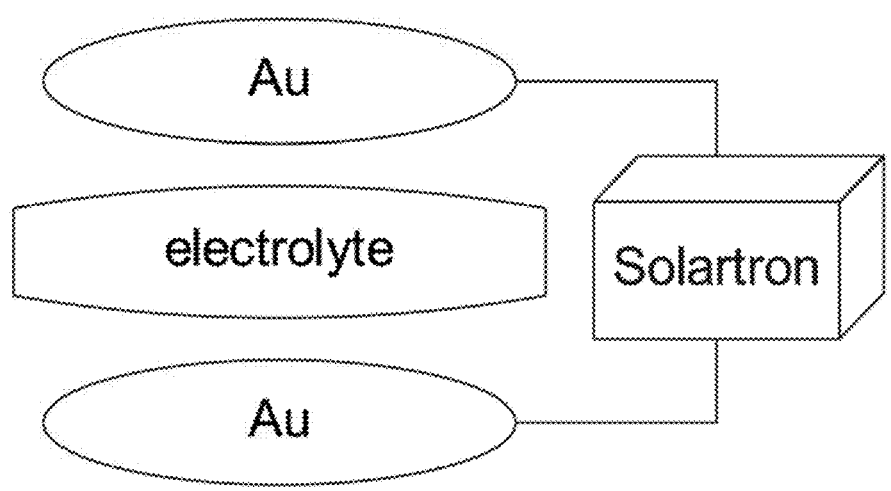
FIG. 20 is a schematic diagram showing a method of measuring a modulus spectrum.

Measurement is performed using an electrolyte interposed between gold (Au) electrodes, and a Solatron 1260 frequency response analyzer (FIG. 20 shows a schematic diagram of a method of measuring a modulus spectrum). A measurement frequency range is in the range of 5 Hz to 32 MHz, the electrolyte is in a dry argon atmosphere without being exposed to air, and measurement is performed in an environment at 25° C. From the equation of $M(\omega)=i\omega\in_0 Z(\omega)/k$ [$\omega$: angular frequency, co: dielectric constant, $Z(\omega)$: complex impedance, k: cell constant], a modulus plot graph in which the horizontal axis represents the common logarithm (base 10) of the frequency (Hz) and the vertical axis represents the imaginary part (M") of the complex modulus is generated. The vertex frequency in the generated graph is set as $\omega_{max}$. Here, according to Non-Patent Document 2, it is reported that the value of $\omega_{max}$ increases in proportion to the size of Nv from $\omega_{max}=Nv*1/\tau)/\in_{fp}$. Since Nv corresponds to the concentration of charge carriers, $\omega_{max}$ can be defined as an index of the Li ion concentration in the electrolyte. In addition, when there are more Li ions that easily move in the electrolyte, since the movement speed of ions becomes more diverse statistically, the peak width appearing in the modulus plot becomes wider (Non-Patent Document 1 and 2). Using such a method, $\omega_{max\text{-}hybrid}$ in the composite electrolyte and $\omega_{max\text{-}organic}$ when the organic electrolyte is used alone can be measured and compared.

Furthermore, in the secondary battery composite electrolyte of the present embodiment, regarding a value d of ½ of the half width that can be measured from a peak of the modulus spectrum, when the value d in the composite electrolyte is set as $d_{hybrid}$, and when the value d in the organic electrolyte included in the composite electrolyte is set as $d_{organic}$, if $d_{organic}$ is 1, $d_{hybrid}$ is preferably greater than 1.

In general, the half width of a peak obtained by an X-ray diffraction method reflects the crystallinity of an inorganic solid electrolyte layer at the same particle diameter. When the crystallinity is high and the regularity of atomic arrangement is high, the half width becomes narrower. When the inorganic compound in the electrolyte layer can be isolated, the crystal structure and the crystallinity can be examined according to a powder X-ray diffraction method using a Cu—Kα radiation source. First, an inorganic compound serving as a target specimen is pulverized to prepare a specimen with an average particle diameter of about 5 μm. The average particle diameter can be determined by a laser diffraction method. The obtained specimen is filled into a holder part having a depth of 0.2 mm formed on a glass specimen plate. In this case, care needs to be taken that sufficient specimen is filled into the holder part. Next, another glass plate is pressed from the outside to smooth the surface of the filled specimen. Care needs to be taken that neither excessive nor an insufficient amount of specimen is filled in such that cracks, voids, unevennesses, and the like do not occur in the filled specimen. In addition, care needs to be taken that the glass plate is pressed with a sufficient pressure. Next, the glass plate into which the specimen is filled is placed in a powder X-ray diffractometer, for measurement according to the X-ray diffraction method using a parallel beam method of a Cu—Kα radiation source, and a diffraction pattern is acquired using a Kβ filter or a monochromator. Measurement conditions include a scanning speed of 5 deg/min, a step width of 0.2 deg, a tube voltage of 40 kV, and a tube current of 300 mA. Here, when the orientation of the specimen is high, there is a possibility of the position of the peak being shifted and the peak intensity ratio being changed according to the method of filling the specimen. A specimen having such a significantly high orientation is measured using a capillary. Specifically, the specimen is inserted into the capillary, and the capillary is placed on a rotating sample stage for measurement. According to such a measurement method, it is possible to relax the orientation. In the obtained diffraction line of the inorganic compound in the electrolyte, when the half width of the single highest intensity peak is 0.05 deg or more and less than 1.00 deg, the regularity of atomic arrangement in crystal is high, high polarization is generated at a contact interface between the inorganic compound and the organic electrolyte due to an external electric field, and a part in which the Li ion concentration is high is easily generated at the contact interface.

Meanwhile, when it is not possible to isolate the inorganic compound in the electrolyte layer, the entire electrolyte layer is analyzed through powder X-ray diffraction, and thus the crystal structure and the crystallinity of the inorganic compound included can be examined. In this case, the thickness of the electrolyte layer serving as a measurement target and the depth of a holder for measurement are matched so that no unevenness is generated on a measurement surface to which X-rays are emitted. For measurement according to the X-ray diffraction method using a parallel beam method of a Cu—Kα radiation source through which it is possible to obtain an output of 40 kV and 200 mA or more, using a Kβ filter or a monochromator, while a step angle is set to 2θ=0.02° or less, and more preferably set to 2θ=0.01° or less, a scanning speed in the θ/2θ coupled scan mode is set to 5 deg/min or less, and more preferably 1 deg/min, the half width of the single highest intensity peak measured under the conditions in which the count of the highest intensity peak is 5000 cps or more is preferably 2θ=0.05 deg or more and less than 1.00 deg. In the obtained diffraction line of an electrolyte layer 12, when the half width of the single highest intensity peak is 0.05 deg or more and less than 1.00 deg, the regularity of atomic arrangement in crystal is high, high polarization is generated at a contact interface between the inorganic compound and the organic electrolyte due to an external electric field, and a part in which the Li ion concentration is high is easily generated at the contact interface.

The secondary battery composite electrolyte of the present embodiment may further include a binder. More preferably, the binder uses macromolecules that gel with carbonates such as polyacrylonitrile (PAN), polyethylene oxide (PEO), polyvinylidene fluoride (PVdF), or polymethyl methacrylate. In the case of PVdF, the amount of the binder is preferably less than 20 weight % with respect to the total mass of the secondary battery composite electrolyte.

The secondary battery composite electrolyte of the present embodiment is preferably a solid state polymer electrolyte or a gel-like polymer electrolyte. The secondary battery composite electrolyte can be appropriately adjusted to be a solid type or a gel type when the composition of the organic electrolyte and the binder is selected. When the secondary battery composite electrolyte is a solid state polymer electrolyte, generally, it is possible to realize a compact secondary battery device. When the secondary battery composite electrolyte is a gel-like polymer electrolyte, operations of producing a secondary battery device, changing the shape, and the like become easier.

According to the secondary battery composite electrolyte of the present embodiment, when the organic electrolyte is combined with the inorganic compound, it is possible to increase ion conductivity. This is because the mobile Li ion concentration increases at the interface between Li ion conductive inorganic solid particles and the organic electrolyte and Li ions easily move. When an Li-containing oxide solid electrolyte having high Li ion conductivity is used as the organic electrolyte, Li ions move more easily. In the present embodiment, since an Li-containing oxide solid electrolyte having high Li ion conductivity is used as the organic electrolyte, movement of Li ions becomes easier. In addition, increasing ion conductivity of the electrolyte has the same effect as lowering the activation energy of the electrolyte itself. When the activation energy can be lowered, the battery can operate in a wider operation temperature range.

In addition, when the organic electrolyte and the inorganic compound described above are used, problems such as the chemical stability of the inorganic compound with respect to the organic electrolyte and dissolution thereof are not caused. When non-Li ion conductive inorganic solid particles are used, a reduction reaction resulting from movement of Li hardly occurs at a high temperature, and it is possible to increase the stability and lifespan of the composite electrolyte.

Second Embodiment

A secondary battery according to a second embodiment has a schematic configuration that includes a positive electrode, a negative electrode formed of negative electrode active material particles that insert and extract Li ions, and an electrolyte layer. In the present embodiment, as shown in FIG. 1, a positive electrode 11, an electrolyte layer 12 and a negative electrode 13 are laminated in this order. This structure is interposed between current collectors 14 to form an electrode body 10A. The example in FIG. 1 is a single layer electrode body in which one set of the structure is laminated.

(Electrolyte Layer)

Figure 4:
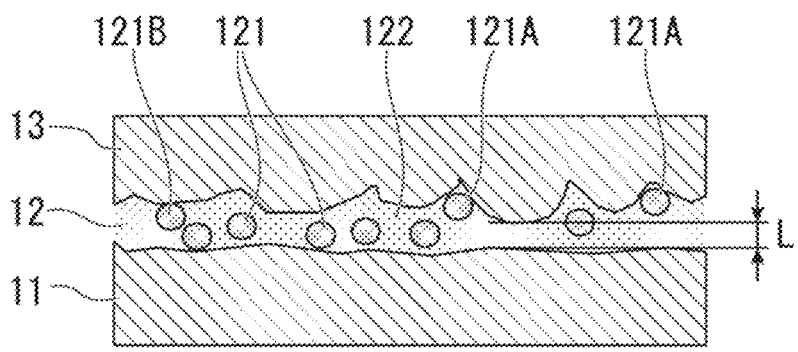
FIG. 4 is a schematic diagram showing an electrode body in FIG. 3B after production.

The electrolyte layer 12 of the present embodiment is a layer including the secondary battery composite electrolyte described in the first embodiment. In the electrolyte layer 12 of the present embodiment, interfaces between the electrolyte layer 12 and each of the positive electrode 11 and the negative electrode 13 are formed along unevennesses of the surfaces of the positive electrode 11 and the negative electrode 13. As shown in FIG. 4 and FIG. 8, the surfaces of the positive electrode 11 and the negative electrode 13 have unevennesses due to these constituent materials and unevennesses due to particles of a positive electrode active material and a negative electrode active material when the positive electrode active material and the negative electrode active material are provided on the surfaces. In particular, the surface of the negative electrode 13 has a large unevenness when particles with an average particle diameter of greater than 5 min are used as secondary particles of the negative electrode active material, which will be described below. The electrolyte layer 12 is in close contact with the positive electrode 11 and the negative electrode 13 along the unevennesses. Specifically, since an organic electrolyte 122 is in the form of a gel or has fluidity before curing in the production process to be described below, it is impregnated into and enters recesses formed according to particles on the surfaces of the positive electrode 11 and the negative electrode 13.

In such a structure, as shown in the SEM image in FIG. 8, the electrolyte layer 12, the positive electrode 11 and the negative electrode 13 are formed such that the surface of the electrolyte layer 12 is in close contact with the surfaces of the positive electrode 11 and the negative electrode 13 along the unevennesses of the surfaces thereof. There is substantially no gap between the electrolyte layer 12 and each of the positive electrode 11 and the negative electrode 13. In particular, when an inorganic solid particle 121A which is one of inorganic solid particles 121 enters the inside of a recess of the negative electrode 13, favorable conductivity is imparted to a surface including the recess of the negative electrode 13 through the inorganic solid particle 121A. In addition, as shown in FIG. 4, in the electrolyte layer 12, a solid metal particle 121B which is a hard particle imparts structural strength to the electrolyte layer 12, and has a function of ensuring a certain thickness of the electrolyte layer 12 (there is no possibility of short circuit due to the positive electrode 11 and the negative electrode 13 that are directly in close contact with each other).

In the present embodiment, the thinnest part of the electrolyte layer 12 is less than 8 µm in thickness. More preferably, the thickness is less than 5 µm. As shown in FIG. 4, the thinnest part of the electrolyte layer 12 is a part (in other words, a part in which the positive electrode 11 and the negative electrode 13 are closest in a convex part of the surface structure of the positive electrode 11 and the negative electrode 13) with the smallest thickness L (in other words, the distance between the positive electrode 11 and the negative electrode 13 at the part) when all of the thickness of the electrolyte layer 12 is observed. Here, in an actually produced battery, the thickness of the electrolyte layer 12 is measured as follows. An electrode body is extracted from the produced battery. A cross section of the laminate of positive electrode/electrolyte/negative electrode is cut along the diagonal line when the extracted electrode body has a rectangular shape (or another polygonal shape), and cut along the diameter line of a circle when the extracted electrode body has a circular shape (or substantially a circular shape including an elliptical shape) using FIB. All cut surfaces are observed using SEM. In this case, the observation magnification is preferably 20000 times. All diagonal lines of the electrode are observed, and the thickness of a part in which the electrolyte layer 12 is thinnest is defined as the thickness of a part of the electrolyte layer with the smallest thickness. In the present embodiment, since the electrolyte layer 12 forms a favorable interface between the solid electrolyte and the active material, it is possible to reduce the thickness of the electrolyte layer 12. When the thickness of the electrolyte layer 12 is reduced, there are advantages in that the size of the secondary battery is reduced and the capacity per volume increases.

Furthermore, in the present embodiment, regarding the thickness of the electrolyte layer 12, the average thickness is 0.1 µm or more and less than 8 µm, and more preferably 0.5 µm or more and 5 µm or less. As a thickness measurement method, an electrode-coated surface is cut along the diagonal line without destroying an organizational structure using FIB, and all cross sections are observed to both ends along the cut surface under SEM at the same magnification. In this case, the observation magnification is preferably 20000 times. When an area of all of the electrolyte layers in the diagonal cross section is obtained from the obtained SEM image, the value of the area is divided by the width of the electrolyte layer that extends in a direction perpendicular to the laminating direction, that is, the length of the cut diagonal cross section, and is converted using the observation magnification, and thus the average thickness can be obtained.

When the electrolyte layer 12 is provided in the battery, a method of applying the electrolyte layer 12 to the positive electrode 11 or the negative electrode or injecting the electrolyte layer 12 between the positive electrode 11 and the negative electrode 13 may be used.

Figure 3A:
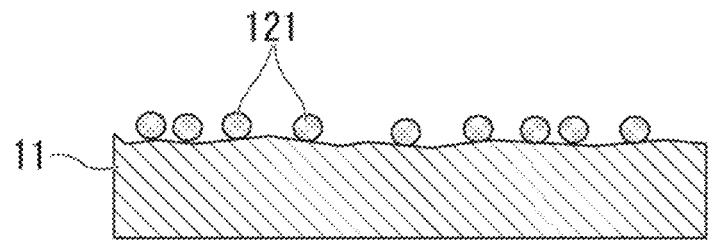
FIG. 3A is a schematic diagram showing one process of a method of producing an electrode body of the second embodiment.
Figure 3B:
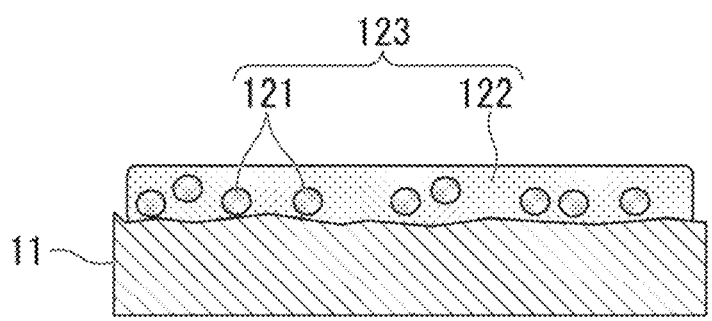
FIG. 3B is a schematic diagram showing the following process in the production method in FIG. 3A.

More specifically, the electrolyte layer 12 can be produced according to the following production method. First, as shown in FIG. 3A, a binder dispersion solution in which the inorganic solid particles 121 are dispersed in a solution of the binder is applied onto the positive electrode 11, and the inorganic solid particles 121 are provided on the positive electrode 11. Then, as shown in FIG. 3B, the organic electrolyte 122 is impregnated onto the positive electrode 11, and heated and mixed to prepare a gel-like secondary battery composite electrolyte 123 including the organic electrolyte 122 and the inorganic solid particles 121. Next, the positive electrode 11 and the negative electrode 13 are arranged to face each other and pressed to obtain an electrode body in which the secondary battery composite electrolyte 12 is interposed between the positive electrode 11 and the negative electrode 13 as shown in FIG. 4. In the present embodiment, in this case, the thickness of the electrolyte layer 12 is adjusted to be in the range described above.

Since the secondary battery composite electrolyte 123(12) is in the form of a gel, when the pressing is performed, the secondary battery composite electrolyte 123(12) enters or is impregnated into gaps of unevennesses with respect to the unevennesses of the positive electrode 11 and the negative electrode 13, and particularly, the unevennesses of the active material on the surface of the electrode. Therefore, the positive electrode 11 and the negative electrode 13 are in close contact with the electrolyte layer 12 along the unevennesses.

Here, when the organic electrolyte is a solid state polymer, an organic electrolyte having fluidity before being solidified may be applied onto the positive electrode 11. In addition, when the application is performed, if the fluidity of the secondary battery composite electrolyte is sufficiently high, a spray or the like may be used. When a spray is used, it is possible to uniformly provide the secondary battery composite electrolyte on the positive electrode 11 and the thickness of the electrolyte layer 12 can be easily adjusted by adjusting the amount of the secondary battery composite electrolyte provided. Furthermore, production may be performed according to a method in which the positive electrode 11 and the negative electrode 13 in which the inorganic solid particles 121 are arranged are arranged at a certain distance from each other (a value set as the thickness of the electrolyte layer 12), and the organic electrolyte 122 is then injected and impregnated thereinto.

In the present embodiment, since the organic electrolyte 122 and the inorganic solid particles 121 enter fine recesses of the positive electrode 11 and the negative electrode 13, the electrolyte layer 12 is in close contact with the positive electrode 11 and the negative electrode 13 without a gap therebetween. Since interfaces between the electrolyte layer 12 and each of the positive electrode 11 and the negative electrode 13 are favorably formed, ion conductivity through the electrolyte layer 12 is improved. Since the positive electrode 11 and the negative electrode 13 are in close contact with the electrolyte layer 12, the thickness of the electrolyte layer 12 can be set in the above-described narrow range.

(Positive Electrode)

In the single layer electrode body 10A shown in FIG. 1, the positive electrode 11 is supported on one surface of the current collector 14. The positive electrode 11 includes an active material, a conductive agent, and a binding agent. As a positive electrode current collector used for the positive electrode 11, an Al (aluminum) foil is used. An Al alloy foil having a purity of 100% (pure Al) to a purity of 99% or more is preferably used. As an Al alloy, an alloy containing at least one element selected from the group consisting of Fe, Mg, Zn, Mn and Si in addition to Al is preferable. For example, when an Al—Fe alloy, an Al—Mn alloy, and an Al—Mg alloy are used, it is possible to obtain a higher strength than with Al. Meanwhile, the amount of a transition metal such as Ni and Cr in the Al or an Al alloy is preferably 100 ppm or less (including 0 ppm). For example, while an Al—Cu alloy has high strength, since the corrosion resistance deteriorates, it is unsuitable as the current collector 14.

In the current collector 14 on which the positive electrode 11 is supported, more preferably, the Al purity is in the range of 99.99 to 99.00%. In such a range, deterioration of the high temperature cycle lifespan due to dissolution of an impurity element can be reduced.

As the positive electrode active material, an Li—Mn composite oxide, an Li—Ni composite oxide, an Li—Co—Al composite oxide, an Li—Ni—Co—Mn composite oxide, a spinel type Li—Mn—Ni composite oxide, an Li—Mn—Co composite oxide, and an olivine type Li iron phosphate (LiFePO$_4$) or Li phosphate Mn (LiMnPO$_4$) are exemplary examples An Li—Mn composite oxide such as Li$_x$Mn$_2$O$_4$ or Li$_x$MnO$_2$, an Li—Ni—Al composite oxide such as LixNi$_{1-y}$Al$_y$O$_2$, an Li—Co composite oxide such as Li$_x$CoO$_2$, an Li—Ni—Co composite oxide such as Li$_x$Ni$_{1-y-z}$CoMn$_z$O$_2$, an Li—Mn—Co composite oxide such as Li$_x$Mn$_y$Co$_{1-y}$O$_2$, a spinel type Li—Mn—Ni composite oxide such as Li$_x$Mn$_{2-y}$Ni$_y$O$_4$, an Li phosphorus oxide having an olivine structure such as Li$_x$FePO$_4$, Li$_x$Fe$_{1-y}$Mn$_y$PO$_4$, and Li$_x$CoPO$_4$, and a fluorinated iron sulfate Li$_x$FeSO$_4$F are exemplary examples. x, and y are preferably in the range of 0 to 1 unless otherwise described. When these are used, since it is possible to obtain a high positive electrode voltage, this is preferable. Among them, when an Li—Ni—Al composite oxide, an Li—Ni—Co—Mn composite oxide, or an Li—Mn—Co composite oxide is used, it is possible to prevent a reaction with the nonaqueous electrolyte under a high temperature environment, and it is possible to significantly improve the battery lifespan. In particular, an Li—Ni—Co—Mn composite oxide represented by Li$_x$Ni$_{1-y-z}$Co$_y$Mn$_z$O$_2$ (0≤x≤1.1, 0≤y≤0.5, 0≤z≤0.5) is preferable. When an Li—Ni—Co—Mn composite oxide is used, it is possible to obtain a high temperature durability and cycle lifespan.

The conductive agent is added to the positive electrode 11 in order to increase electron conductivity and minimize the contact resistance with respect to the current collector. As the conductive agent, for example, acetylene black, carbon black, and graphite are exemplary examples.

As the binding agent for binding the active material and the conductive agent, for example, polytetrafluoroethylene (PTFE), polyvinylidene fluoride (PVdF), and fluorine-based rubber are exemplary examples.

The combinational proportions of the positive electrode active material, the conductive agent, and the binding agent are preferably in the range of 80 weight % or more and 95 weight % or less for the positive electrode active material, in the range of 3 weight % or more and 18 weight % or less for the conductive agent, and in the range of 2 weight % or more and 7 weight % or less for the binding agent. When the conductive agent is set to 3 weight % or more, the effect described above can be exhibited. When the conductive agent is set to 18 weight % or less, it is possible to reduce decomposition of the nonaqueous electrolyte on the surface of the conductive agent during high temperature storage. When the binding agent is set to 2 weight % or more, sufficient electrode strength can be obtained. When the binding agent is set to 7 weight % or less, it is possible to decrease an insulation part of the electrode.

The positive electrode 11 is produced when, for example, a positive electrode active material, a conductive agent, and a binding agent are suspended in an appropriate solvent, and the suspension is applied to a positive electrode current collector, dried and pressed. The pressing pressure of the positive electrode is preferably in the range of 0.15 ton/mm to 0.3 ton/mm. In such a range, the adhesion (peel strength) between a positive electrode layer and an Al foil positive electrode current collector increases, and the elongation rate of a positive electrode current collector foil is 20% or less which is preferable.

(Negative Electrode)

In the single layer electrode body 10A shown in FIG. 1, the negative electrode 13 is supported on one surface of the current collector 14. The negative electrode 13 includes an active material, a conductive agent, and a binding agent. Regarding the current collector used for the negative electrode, as an Al foil, an Al alloy foil having a purity of 100% (pure Al) to a purity of 98% or more is preferably used. As an Al alloy, an alloy containing at least one element selected from the group consisting of Fe, Mg, Zn, Mn and Si in addition to Al is preferable. For example, when an Al—Fe alloy, an Al—Mn alloy, and an Al—Mg alloy are used, it is possible to obtain a higher strength than with Al. Meanwhile, the amount of a transition metal such as Ni and Cr in the Al or an Al alloy is preferably 100 ppm or less (including 0 ppm). For example, while an Al—Cu alloy has high strength, since the corrosion resistance deteriorates, it is unsuitable as the current collector 14.

In the current collector 14 on which the negative electrode 13 is supported, more preferably, the Al purity is in the range of 99.95 to 98.0%. As will be described below, when Ti-containing oxide particles of 2 μm or more are used as secondary particles of the negative electrode active material according to the present embodiment, since the pressing pressure of the negative electrode can be reduced and the extension of the Al foil can be reduced, this purity range is appropriate. As a result, there is an advantage of electron conductivity of the Al foil current collector increasing, and further, it is possible to produce a negative electrode having low resistance by preventing crushing of secondary particles of a Ti-containing oxide to be described below.

Examples of the negative electrode active material particles that insert and extract Li ions of the negative electrode active material include a carbon material, a graphite material, an Li alloy material, a metal oxide, and a metal sulfide. Furthermore, a negative electrode active material containing Ti is preferable. Among them, negative electrode active material particles of at least one Ti-containing oxide selected from the group consisting of an Li—Ti oxide, a Ti oxide, an Nb—Ti oxide, and an Li—Na—Nb—Ti oxide which have an Li ion occlusion and extract potential that is in the range of 1 to 3 V according to an Li potential reference are particularly preferably selected.

As the Li—Ti oxide, a spinel structure Li—Ti oxide represented by the general formula $Li_{4+x}Ti_5O_{12}$ (x satisfies −1≤x≤3), Li—Ti oxides such as $Li_{2+x}Ti_3O_7$, $Li_{1+x}Ti_2O_4$, $Li_{1.1+x}Ti_{1.8}O_4$, $Li_{1.07+x}Ti_{1.86}O_4$, $Li_xTiO_2$ (x satisfies 0≤x) as Ramsdellite structure Li—Ti oxides, and Ti oxides represented by the general formula $Li_xTiO_2$ (0≤x) with a monoclinic structure ($TiO_2(B)$ as a structure before charging) a rutile structure, or an anatase structure ($TiO_2$ as a structure before charging) are exemplary examples. The Nb—Ti oxide is represented by $Li_aTiM_bNb_{2+\beta}O_{7+\sigma}$ (0≤a≤5, 0≤b≤0.3, 0≤β≤0.3, 0≤σ≤0.3, M denotes at least one element selected from among Fe, V, Mo, and ITa). These may be used alone or in a combination thereof. More preferably, a spinel structure LiTi oxide in which a change in volume is very small and which is represented by the general formula $Li_{4+x}Ti_5O_{12}$ (x satisfies −1≤x≤3) may be used. When such a Ti-containing oxide is used, it is possible for a negative electrode current collector to use the same Al foil as in the positive electrode current collector in place of a copper foil of the related art, and it is possible to reduce the weight and costs. In addition, it is advantageous in consideration of the weight and a capacity per size of a secondary battery having a bipolar electrode structure to be described below.

The average particle diameter of the negative electrode active material is set to be in the above range because when primary particles having an average particle diameter of greater than 1 μm are used and the specific surface area of the negative electrode 13 increases to 3 to 50 $m^2/g$, a decrease in porosity of the negative electrode 13 is unavoidable. However, when the average particle diameter is small, particles are likely to aggregate, the distribution of the nonaqueous electrolyte is likely to be biased toward the negative electrode 13, and thus there is a risk of depletion of the electrolyte in the positive electrode 11. Thus, the lower limit value is desirably 0.001 μm.

Desirably, the negative electrode active material has an average particle diameter of 1 μm or less and a BET specific surface area according to $N_2$ adsorption is in the range of 3 $m^2/g$ to 200 $m^2/g$. Therefore, it is possible to further increase the affinity with the nonaqueous electrolyte of the negative electrode 13.

The negative electrode active material may include secondary particles in addition to the above-described primary particles. The average particle diameter (diameter) of the secondary particles of the negative electrode active material is preferably greater than 5 μm and more preferably 7 μm to 20 μm. In such a range, it is possible to produce a high density negative electrode while the pressing pressure of the negative electrode is low, and it is possible to prevent the extension of the Al foil current collector.

The negative electrode active material including secondary particles having an average particle diameter of greater than 5 μm is prepared when active material raw materials are reacted and synthesized to produce active material precursors having an average particle diameter of 1 μm or less, a calcining treatment is then performed, a pulverizing treatment is performed using a pulverizer such as a ball mill and a jet mill, and in an additional calcining treatment, the active material precursors (precursors) then aggregate and are grown into secondary particles having a large particle diameter. A negative electrode active material including primary particles having an average particle diameter of 1 μm or less is desirable. Thereby, these effects become significant in high input performance (rapid charging). This is because, for example, the diffusion distance of Li ions inside the active material is shortened and the specific surface area increases. Here, more preferably, the average particle diameter is 0.1 μm to 0.8 μm. In addition, a carbon material is preferably applied to the surfaces of the secondary particles because the resistance of the negative electrode is reduced. This can be produced when precursors of a carbon material are added in the secondary particle production process and calcined at 500° C. or more in an inert atmosphere.

In addition, in the negative electrode layer after the negative electrode is produced, secondary particles and primary particles of the Ti-containing oxide may be mixed in. In order to obtain a higher density, the primary particles are preferably included at 5 to 50 volume % in the negative electrode layer.

The reason for the specific surface area of the negative electrode 13 being defined in the above range will be described. When the specific surface area is less than 3 $m^2/g$, since particle aggregation is noticeable, the affinity between the negative electrode 13 and the nonaqueous electrolyte is lowered, and the interface resistance of the negative electrode 13 increases, and output characteristics and charging and discharging cycle characteristics deteriorate. On the other hand, when the specific surface area exceeds 50 $m^2/g$, since the distribution of the nonaqueous electrolyte is biased toward the negative electrode 13, and there is insufficient nonaqueous electrolyte in the positive electrode 11, output characteristics and charging and discharging cycle characteristics are not improved. A more preferable range of the specific surface area is 5 $m^2/g$ to 50 $m^2/g$. Here, the specific surface area of the negative electrode 13 refers to a surface area per 1 g of the negative electrode layer (excluding the weight of the current collector). Here, the negative electrode layer is a porous layer including a negative electrode active material, a conductive agent, and a binding agent supported on the current collector.

The porosity (excluding the current collector) of the negative electrode 13 is desirably in the range of 20 to 50%. Thereby, it is possible to obtain a high density negative electrode 13 having excellent affinity between the negative electrode 13 and the nonaqueous electrolyte. A more preferable range of the porosity is 25 to 40%.

The negative electrode current collector is desirably an Al foil or an Al alloy foil. The thickness of the Al foil or the Al alloy foil is 20 µm or less, and more preferably 15 µm or less. The purity of the Al foil is preferably 99.99% or more. As the Al alloy, an alloy containing an element such as Mg, zinc, or silicon is preferable. Meanwhile, there is preferably 100 ppm or less of a transition metal such as iron, copper, Ni, or Cr.

As the conductive agent, for example, a carbon material can be used. Examples of the carbon material include acetylene black, carbon black, coke, carbon fibers, and graphite. Examples of the conductive agents include Al powder, and TiO. More preferably, at a heat treatment temperature of 800° C. to 2000° C., coke, graphite, and TiO powder having an average particle diameter of 10 µm or less and carbon fibers having an average fiber diameter of 1 µm or less are preferably used. The BET specific surface area according to $N_2$ adsorption of the carbon material is preferably 10 $m^2/g$ or more.

Examples of the binding agent include polytetrafluoroethylene (PTFE), polyvinylidene fluoride (PVdF), fluorine-based rubber, styrene butadiene rubber, and a core and shell binder.

The combinational proportions of the active material, the conductive agent, and the binding agent of the negative electrode 13 are preferably in the range of 80 to 95 weight % for the negative electrode active material, in the range of 3 to 18 weight % for the conductive agent and in the range of 2 to 7 weight % for the binding agent.

The negative electrode 13 is produced when the above negative electrode active material, conductive agent, and binding agent are suspended in an appropriate solvent, and the suspension is applied to a current collector, dried, and thermally pressed. In this case, while the amount of the binding agent added is small, particles of the negative electrode active material are uniformly dispersed. This is because, when the amount of the binding agent added is larger, the dispersibility of particles is likely to increase, but the surfaces of the particles are easily covered with the binding agent, and the specific surface area of the negative electrode 13 is smaller. When the amount of the binding agent added is small, since particles easily aggregate, stirring conditions (the rotational speed of the ball mill, a stirring time, and a stirring temperature) are adjusted, particle aggregation is prevented, and thus fine particles can uniformly disperse. Therefore, the negative electrode 13 of the present embodiment is obtained. Furthermore, even if the amount of the binding agent added and the stirring conditions are in appropriate ranges, when the amount of the conductive agent added is large, the surface of the negative electrode active material is easily covered with the conductive agent, and there tends to be fewer pores in the surface of the negative electrode. Therefore, the specific surface area of the negative electrode 13 tends to decrease. In addition, when the amount of the conductive agent added is small, the negative electrode active material is easily pulverized, the specific surface area of the negative electrode 13 increases, or the dispersibility of the negative electrode active material decreases, and thus the specific surface area of the negative electrode 13 tends to decrease. Further, in addition to the amount of the conductive agent added, the average particle diameter and the specific surface area of the conductive agent also influence the specific surface area of the negative electrode 13. Desirably, the conductive agent has an average particle diameter that is equal to or less than the average particle diameter of the negative electrode active material and has a specific surface area that is greater than the specific surface area of the negative electrode active material.

(Bipolar Electrode Structure)

Figure 2:
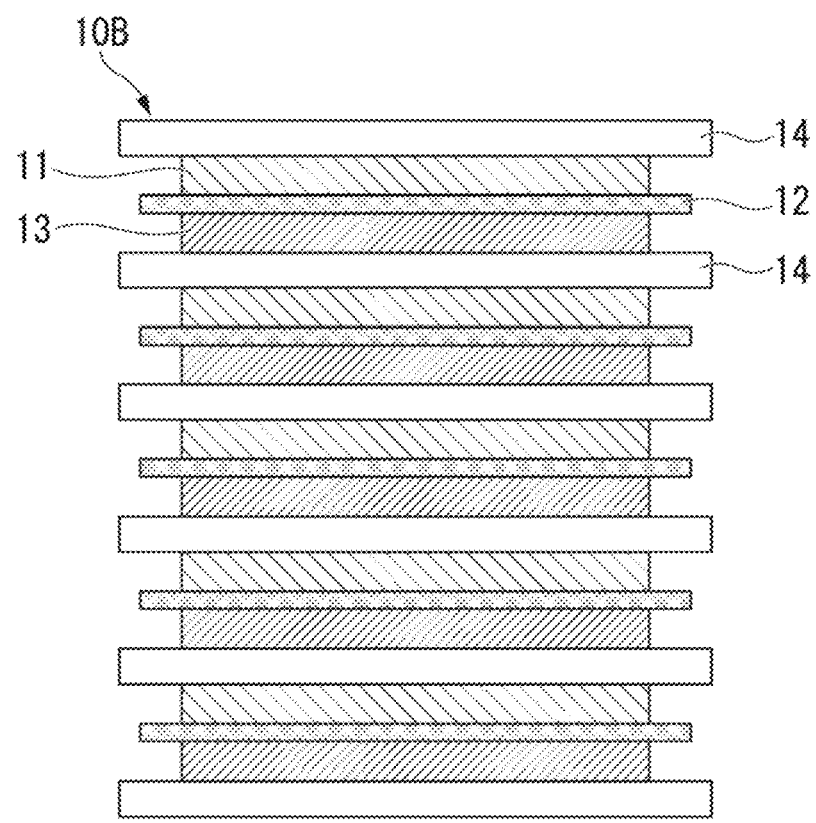
FIG. 2 is a schematic side view showing an electrode body having a bipolar electrode structure according to another form of the second embodiment.

As another form of the present embodiment, an electrode body 10B having a bipolar electrode structure shown in FIG. 2 can be provided. That is, a structure in which the current collector 14, the positive electrode 11, the electrolyte layer 12, and the negative electrode 13 are laminated in this order is set as one set, two or more sets are laminated, and the current collector 14 may be laminated on one surface of the endmost side negative electrode 13 may be used. The number of structures to be laminated can be appropriately selected according to the design of the shape and the size of the battery. In the shown example, five sets are laminated. Since the electrode body 10B of the present embodiment can have a thin shape in which the electrolyte layer 12 is in close contact with the positive electrode 11 and the negative electrode 13, when a plurality of structures are laminated, it is possible to obtain a secondary battery having a thin shape, requiring less space, having a large capacity, and having excellent cycle lifespan performance, thermal stability, and electrochemical stability.

(Exterior Member)

The above electrode bodies 10A and 10B are accommodated in an exterior member and used. As the exterior member in which the electrode bodies 10A and 10B are accommodated, a metallic exterior member or a laminate film exterior member can be used.

As the metallic exterior member, a metal can made of Al, an Al alloy, iron, or stainless steel and having a square shape or a cylindrical shape can be used. In addition, the plate thickness of the exterior member is preferably in the range of 0.5 mm or less, and more preferably 0.3 mm or less.

As the laminate film exterior member, for example, a multilayer film in which an Al foil is coated with a resin film can be exemplified. As the resin, a polymer resin such as polypropylene (PP), polyethylene (PE), nylon, and polyethylene terephthalate (PET) can be used. In addition, the thickness of the laminate film is preferably 0.2 mm or less. The purity of the Al foil is preferably 99.5% or more.

In the metal can made of an Al alloy, an alloy containing an element such as Mn, Mg, Zn, or Si and having an Al purity of 99.8% or less is preferably used. When an Al alloy is used, the strength of the metal can significantly increases, and it is possible to reduce the wall thickness of the can. As a result, it is possible to realize a battery that is thin and lightweight, and has a high output and excellent heat dissipation properties.

The above secondary batteries may be connected in series or in parallel, combined with another type of battery, and/or combined with a casing or the like to form a battery pack.

Figure 5:
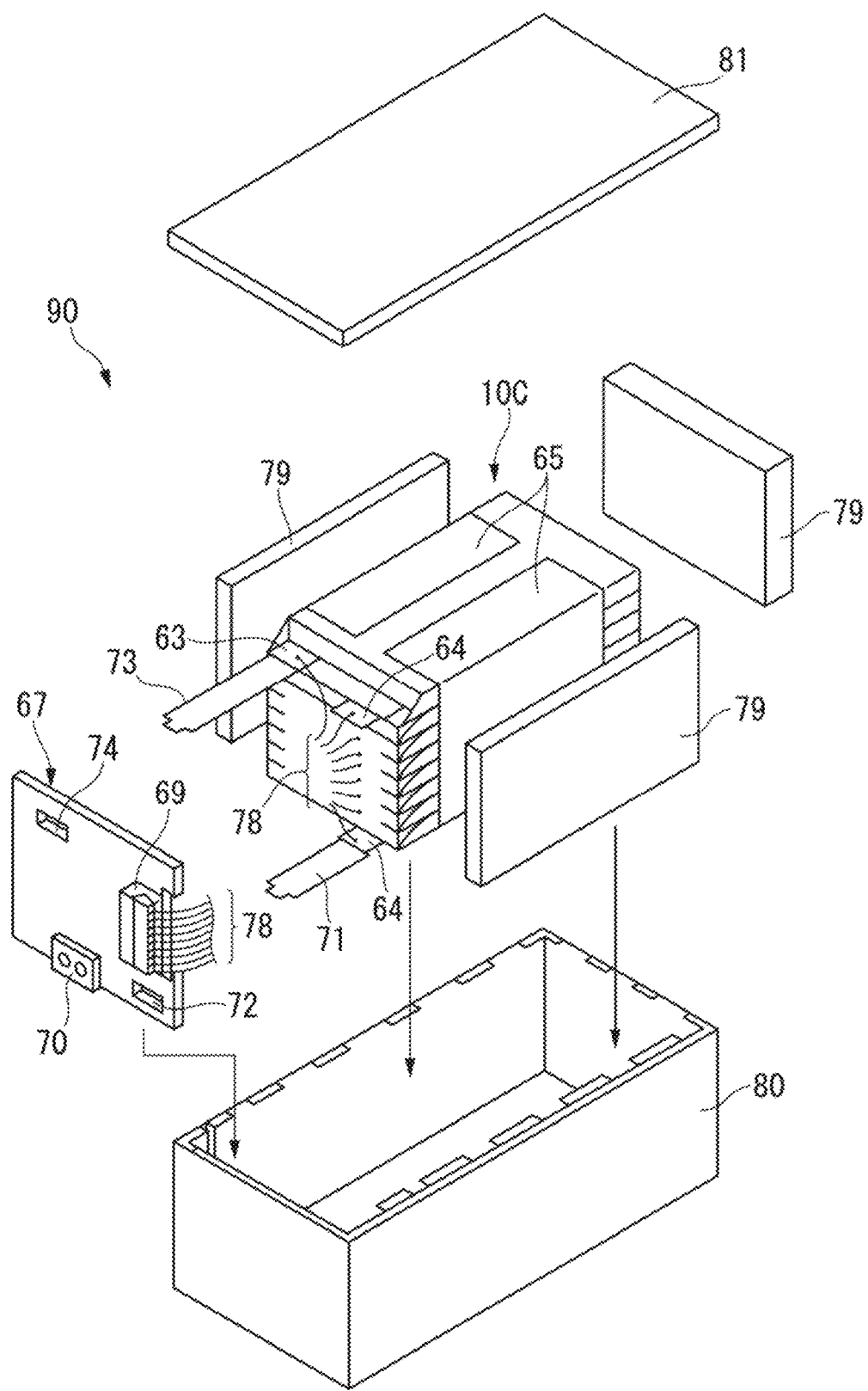
FIG. 5 is an exploded perspective view showing a schematic configuration of a battery pack in which the secondary battery of the present embodiment is accommodated.
Figure 6:
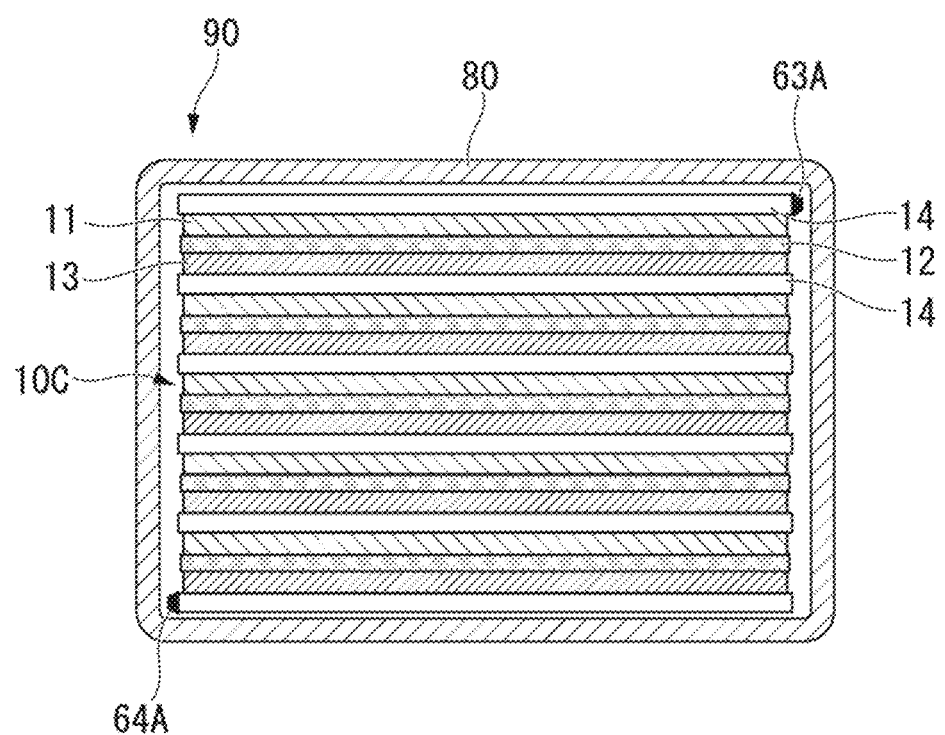
FIG. 6 is a side cross-sectional view of a secondary battery of the present embodiment.
Figure 7:
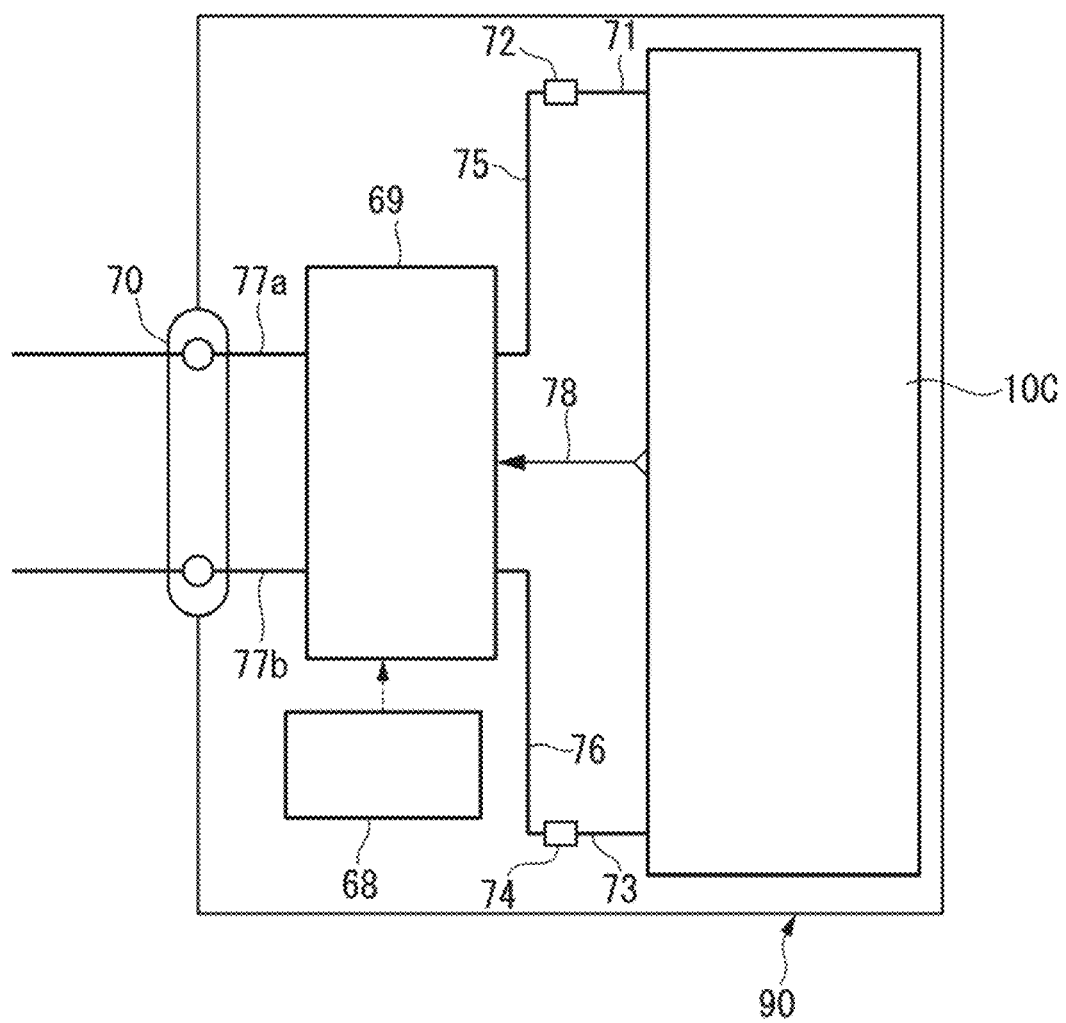
FIG. 7 is a block diagram showing an electronic circuit of the battery pack in FIG. 5.

FIG. 5 is an exploded perspective view showing a schematic configuration of a battery pack 90 in which a secondary battery 10C according to the present embodiment is accommodated. FIG. 6 is a side cross-sectional view of a battery pack 90 constituting the secondary battery 10C. FIG. 7 is a block diagram showing an electronic circuit of the battery pack 90.

As shown in FIG. 6, the secondary battery 10C is accommodated in a storage container 80 and the positive electrode 11, the electrolyte layer 12, the negative electrode 13, and the current collector 14 are laminated in the same manner as in the bipolar electrode bodies 10A and 10B in FIG. 2. A positive electrode current collector tab 63A is provided at the current collector 14 (the top in the drawing) adjacent to the endmost side positive electrode 11, and a negative electrode current collector tab 64A is provided at the current collector 14 (the bottom in the drawing) adjacent to the endmost side negative electrode 13. A negative electrode terminal 63 and a positive electrode terminal 64 that extend to the outside as shown in FIG. 5 are connected to the positive electrode current collector tab 63A and the negative electrode current collector tab 64A. A plurality of battery pack 90 are fastened using an adhesive tape 65 to form the secondary battery 10C.

A printed wiring board 67 shown in FIG. 5 is arranged to face a side surface from which the negative electrode terminal 63 and the positive electrode terminal 64 of the secondary battery 10C extend. As shown in FIG. 7, a thermistor 68, a protective circuit 69, and an energizing terminal 70 for an external device are mounted on the printed wiring board 67. Here, on a surface of the printed wiring board 67 that faces the secondary battery 10C, an insulating plate (not shown) is attached in order to avoid an unnecessary connection with a wiring of the secondary battery 10C.

A positive electrode-side lead 71 is connected to the positive electrode terminal 64 positioned on the lowermost layer of the secondary battery 10C, and a tip thereof is inserted into a positive electrode-side connector 72 of the printed wiring board 67 and electrically connected thereto. A negative electrode-side lead 73 is connected to the negative electrode terminal 63 positioned on the uppermost layer of the secondary battery 10C and a tip thereof is inserted into a negative electrode-side connector 74 of the printed wiring board 67 and electrically connected thereto. The connectors 72 and 74 are connected to the protective circuit 69 through wirings 75 and 76 formed on the printed wiring board 67.

The thermistor 68 detects the temperature of the secondary battery 10C and transmits a detection signal to the protective circuit 69. The protective circuit 69 can block a positive side wiring 77a and a negative side wiring 77b between the protective circuit 69 and the energizing terminal 70 for an external device under predetermined conditions. As an example, the predetermined conditions include that, for example, a temperature detected by the thermistor 68 is a predetermined temperature or higher. In addition, as another example, the predetermined conditions include that, for example, an overcharge, an overdischarge, an overcurrent, or the like of the secondary battery 10C has been detected. The detection of such an overcharge is performed for all of the secondary batteries 10C.

When an overcharge or the like of the secondary battery 10C is detected, a battery voltage may be detected, or a positive electrode potential or a negative electrode potential may be detected. In the case of the latter, a lithium electrode used as a reference electrode is inserted into each of the secondary batteries 10C. In the battery pack 90 in FIGS. 5 to 7, a wiring 78 for voltage detection is connected to the secondary battery 10C. A detection signal is transmitted to the protective circuit 69 through the wiring 78.

On three side surfaces of the secondary battery 10C except the side surface from which the positive electrode terminal 64 and the negative electrode terminal 63 protrude, protective sheets 79 made of rubber or a resin are arranged.

The secondary battery 10C is accommodated in a storage container 80 together with the protective sheets 79 and the printed wiring board 67. That is, the protective sheets 79 are arranged on both inner sides of the storage container 80 in the long side direction and an inner side in the short side direction, and the printed wiring board 67 is arranged on an inner side surface opposite thereto in the short side direction. The secondary battery 10C is positioned in a space surrounded by the protective sheet 79 and the printed wiring board 67. A cover 81 is attached to the upper surface of the storage container 80.

Here, in place of the adhesive tape 65, a heat shrinkable tape may be used to fix the secondary battery 10C. In this case, the protective sheets 79 are arranged on both side surfaces of the secondary battery 10C, a heat shrinkable tube is wound therearound, and the heat shrinkable tube is then thermally shrunk to bind the secondary battery 10C.

In addition, the mode of the battery pack 90 may be appropriately changed depending on applications. The battery pack 90 having cycle characteristics with high current characteristics is preferable for applications. As specific applications, a power supply of a digital camera, and automotive applications for two-wheel to four-wheel hybrid electric vehicles, two-wheel to four-wheel electric vehicles, and assisted bicycles are exemplary examples. In particular, the battery pack 90 is suitably used for automotive applications.

According to the secondary battery of the present embodiment, the bonding of the positive electrode 11, the negative electrode 13, and the electrolyte layer 12 including the secondary battery composite electrolyte does not deteriorate during the charging and discharging cycle, an increase in interface resistance is prevented, and cycle lifespan performance is significantly improved. In addition, when the organic electrolyte is used in the electrolyte layer 12, thermal stability and electrochemical stability in a high temperature environment are improved.

EXAMPLES

Example 1

In order to examine performance of a composite electrolyte, a single layer electrode body including the form of positive electrode/composite electrolyte/negative electrode in FIG. 1 was produced. As a positive electrode active material, $LiMn_{0.85}Fe_{0.1}Mg_{0.05}PO_4$ having an olivine structure in which primary particles having surfaces to which fine carbon particles (average particle diameter of 5 nm) were attached (an attachment amount was 0.1 weight %) had an average particle diameter of 50 nm was used. Into this material, as a conductive agent, 3 weight % with respect to the entire positive electrode of vapor grown carbon fibers having a fiber diameter 0.1 μm, 5 weight % of graphite powder, and as a binding agent, 5 weight % with respect to the entire positive electrode of PVdF were mixed and then this was dispersed in an n-methyl pyrrolidone (NMP) solvent to prepare a slurry. Then, the slurry was applied to the side of an aluminum alloy foil (purity of 99%) with a thickness of 15 μm and dried, and this was subjected to a pressing process. Therefore, a positive electrode in which the thickness of a positive electrode layer on one side was 67 μm and the electrode density was 2.2 g/cm³ was produced.

As a negative electrode active material, $Li_4Ti_5O_{12}$ particles having an average particle diameter of 0.6 μm and a specific surface area of 10 m²/g, graphite powder having an average particle diameter of 6 μm as a conductive agent, and PVdF as a binding agent were mixed at a weight ratio of 95:3:2, dispersed in an n-methyl pyrrolidone (NMP) solvent, pulverized using a ball mill at 1000 rpm (the rotational speed), and stirred under conditions of a stirring time of 2 hours to prepare a slurry. The obtained slurry was applied to an aluminum alloy foil (purity of 99.3%) with a thickness of 15 μm, dried, and was subjected to a heating and pressing process to produce a negative electrode. Therefore, a negative electrode in which the thickness of a negative electrode layer on one side was 59 μm and the electrode density was 2.2 g/cm³ was produced. The porosity of the negative electrode excluding the current collector was 35%.

A composite electrolyte was prepared by mixing and compositing a predetermined amount of $Li_{1.7}La_3Zr_2O_{12}$ particles having a primary particle size (average particle diameter) of 0.1 μm and a gel-like polyacrylonitrile polymer included in a solvent mixture (volume ratio of 1:2) of propylene carbonate and diethyl carbonate in which 1.2 M of $LiPF_6$ was dissolved so that the weight ratio was 96:3.2:0.8. A composite electrolyte with a thickness of 2 μm was provided on electrodes of a positive electrode and a negative electrode.

In the compositing process of the electrolyte, $Li_7La_3Zr_2O_{12}$ particles were dispersed in a PVdF binder solution which was then dissolved in an n-methyl pyrrolidone (NMP) solution before gelling. The dispersion solution was applied to a positive electrode and a negative electrode using a coating spray and dried. Then, a solvent mixture (volume ratio of 1:2) of propylene carbonate and diethyl carbonate in which 1.2 M of $LiPF_6$ was dissolved and to which a gelling agent was added and a solution of polyacrylonitrile (PAN) macromolecules (2 weight %) were impregnated into the electrode and the composite electrolyte and heated to produce a gelled composite electrolyte. In this case, the amounts of organic components inside the electrode and the composite electrolyte were adjusted to 3% and 4% (weight ratio), respectively. In addition, the weight ratio between the inorganic particles, the binder, and the organic components in the composite electrolyte was 94.3:1.9:3.8. Here, in the following examples, when the thickness of the composite electrolyte was measured, cutting was performed using FIB, and a cross section of the composite electrolyte was observed under SEM. At that time, the magnification was 20,000 times.

Figure 9:
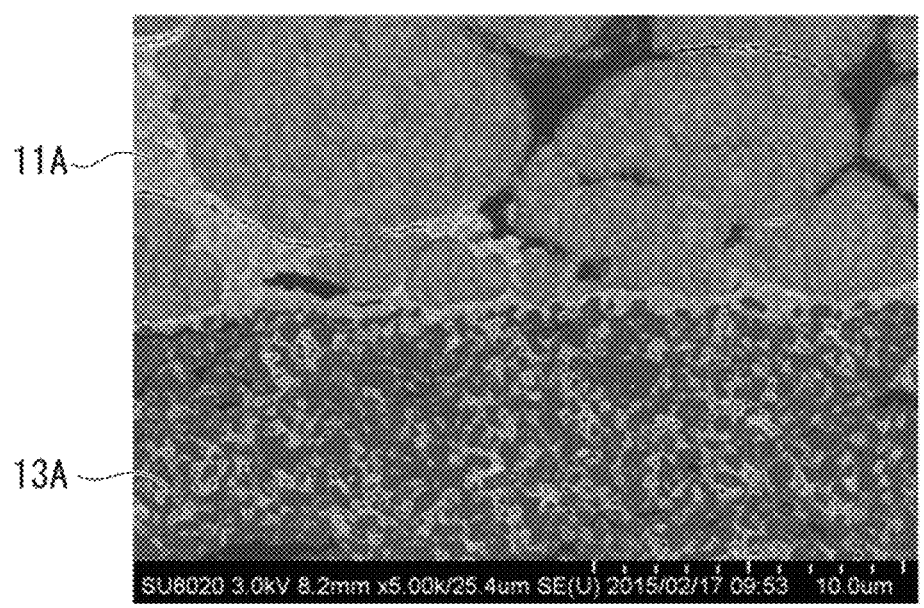
FIG. 9 is an SEM image of another part of the electrode body in FIG. 8.

In the single layer electrode body of Example 1, a cross section of a laminate of a positive electrode 11A, an electrolyte 12A, and a negative electrode 13A was cut along the diagonal line of the electrode using FIB, and the SEM image of the cut surface observed is shown in FIG. 8. The magnification was 20,000 times. Unevennesses were formed at interfaces between the composite electrolyte 12A (LLZ hybrid electrolyte layer) and each of the positive electrode 11A (LTO anode) and the negative electrode 13A (LMFP cathode). The thickness of the composite electrolyte 12A differed depending on parts and an average thickness was 2 μm. It was confirmed that interfaces between the composite electrolyte 12A and each of the positive electrode 11A and the negative electrode 13A were formed along unevennesses of surfaces of the positive electrode 11A and the negative electrode 13A, and the electrolyte 12A was in close contact with the positive electrode 11A and the negative electrode 13A. In addition, another part of this example is shown in FIG. 9 in which the electrolyte 12A was in close contact with the positive electrode 11A and the negative electrode 13A, and the thickness was thinner than in FIG. 8.

Examples 2 to 14

A lithium secondary battery was produced in the same manner as in Example 1 except that $Li_7La_3Zr_2O_{12}$ particles having a primary particle size (average particle diameter) of 0.05 μm to 7.8 μm were used as a composite electrolyte.

Examples 15 to 24

A lithium secondary battery was produced in the same manner as in Example 1 except that $Li_7La_3Zr_2O_{12}$ particles having a primary particle size (average particle diameter) of 0.1 μm were used as a composite electrolyte. In this case, the composite electrolyte with a thickness of 0.6 μm to 7.9 μm was provided on electrodes of a positive electrode and a negative electrode.

Examples 25 to 31

A lithium secondary battery was produced in the same manner as in Example 1 except that $Li_7La_3Zr_2O_{12}$ particles having a primary particle size (average particle diameter) of 0.1 μm were used as a composite electrolyte, and the amount of organic components in the electrode was adjusted to 0.1 weight to 25.0 weight %.

Examples 32 to 38

A lithium secondary battery was produced in the same manner as in Example 1 except that a composite electrolyte was prepared by mixing and compositing a predetermined amount of $Li_7La_3Zr_2O_{12}$ particles having a primary particle size (average particle diameter) of 0.1 μm and a gel-like polyacrylonitrile polymer included in a solvent mixture (volume ratio of 1:2) of propylene carbonate and diethyl carbonate in which 1.2 M of $LiPF_6$ was dissolved so that the weight ratio was 96:3.5:0.5, 96:3.0:1.0, 96:2.5:1.5, 96:2.0:2.0, 96:1.5:2.5, 96:1.0:3.0, 96:0.5:3.5.

Examples 39 to 42

A lithium secondary battery was produced in the same manner as in Example 1 except that a composite electrolyte was prepared by using $Li_7La_3Zr_2O_{12}$ particles having a primary particle size (average particle diameter) of 0.1 μm and adjusting the weight ratio of inorganic particles, a binder, and organic components in the composite electrolyte to 94.3:0.1:5.6, 94.3:0.5:5.2, 94.3:2.9:2.9, 94.3:5.6:0.1.

Examples 43 to 46

A composite electrolyte was produced in the same manner as in Example 1 except that a composite electrolyte was composited using $Li_{1.4}Al_{0.4}Ti_{1.6}(PO_4)_3$ (Example 43), $Li_{0.5}La_{0.5}TiO_3$ (Example 44), $Li_{3.6}Si_{0.6}PO_4$ (Example 45), and LiPON (Example 46) which had a primary particle size (average particle diameter) of 0.1 μm.

Example 47

Figure 10:
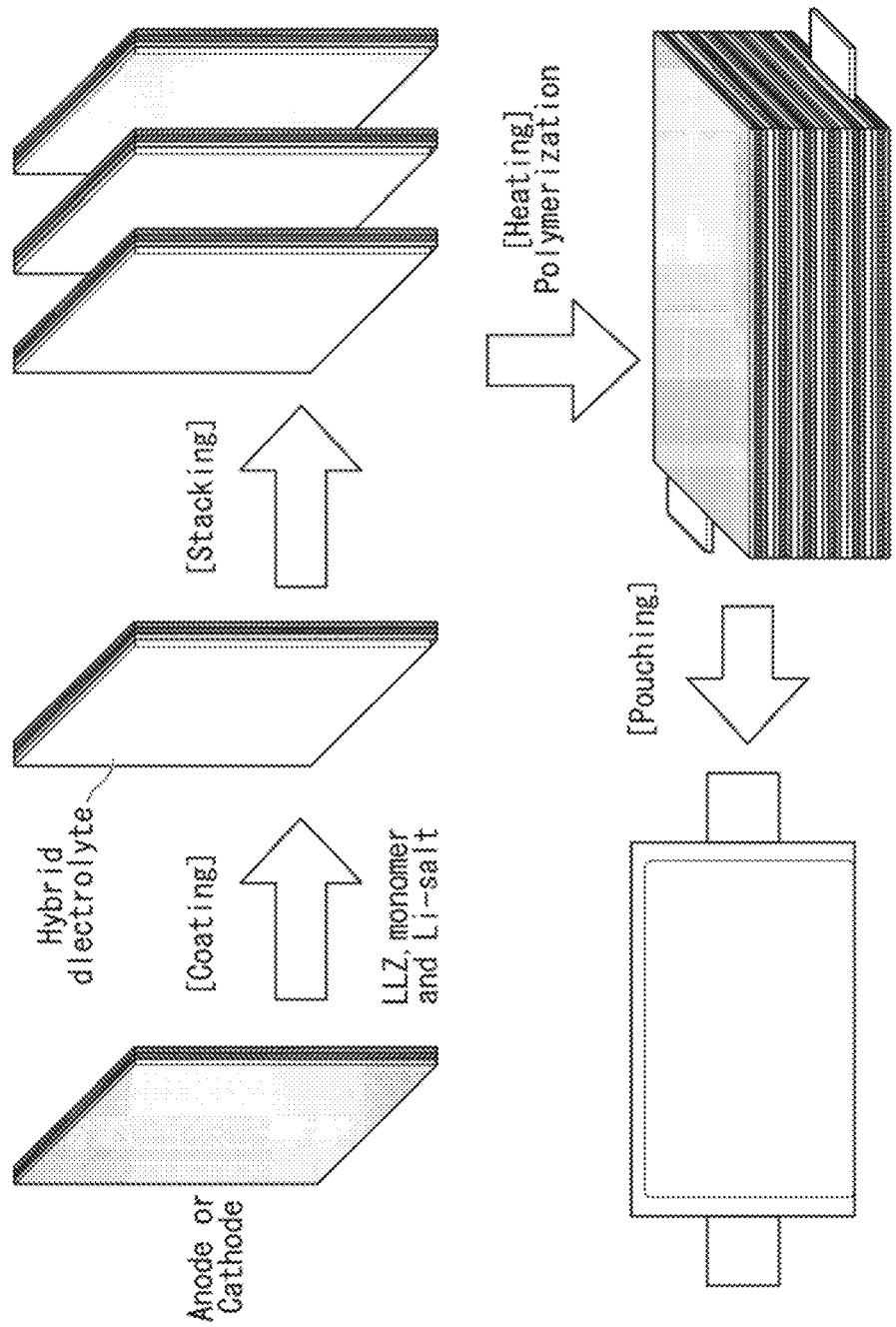
FIG. 10 is a schematic diagram showing a process of producing a secondary battery of Example 47.

In order to examine the battery performance of a secondary battery having a bipolar electrode structure, both positive and negative electrodes-facing electrodes in which the positive electrode of Example 1 was formed on one side of an Al current collector and the negative electrode of Example 1 was formed on the other side were produced. An electrode in which a positive electrode was formed on one side of an Al current collector and a negative electrode was formed on the other side was produced. Then, the composite electrolyte described in Example 1 was applied to the surfaces of the positive electrode and the negative electrode using a coating spray. The thickness of the surface-coated electrolyte layer was 2 μm. Meanwhile, a solvent mixture (volume ratio of 1:2) of propylene carbonate (PC) and diethyl carbonate in which 1 M of $LiPF_6$ was dissolved before gelling and a solution of polyacrylonitrile macromolecules (2 weight %) were injected and impregnated into voids between the positive electrode and the negative electrode. Then, healing was performed on a gelling agent, and gelling was caused to produce an electrode body having a 5-layer bipolar electrode structure (FIG. 2). Then, the body was accommodated in a laminate type exterior member, and the outer periphery of the exterior member was thermally sealed to produce a secondary battery. These processes are shown in FIG. 10.

Comparative Example 1

A 20 μm polypropylene (PP) separator was interposed between a positive electrode and a negative electrode. As an organic electrolyte, a gel-like polyacrylonitrile polymer (2 weight %) included in a solvent mixture (volume ratio of 1:2) of propylene carbonate and diethyl carbonate in which 1.2 M of $LiPF_6$ was dissolved was used, and the electrolyte was impregnated to produce a lithium secondary battery.

Comparative Example 2

A lithium secondary battery was produced in the same manner as in Comparative Example 1 except that a 20 μm polyethylene (PE) separator was used.

Comparative Example 3

$Li_7La_3Zr_2O_{12}$ particles having a primary particle size (average particle diameter) of 1 μm were used to produce a sintered body, and this body was interposed between a positive electrode and a negative electrode to produce a lithium secondary battery.

Comparative Example 4

A gel-like polyacrylonitrile polymer (2 weight %) included in a solvent mixture (volume ratio of 1:2) of propylene carbonate and diethyl carbonate in which 1.2 M of $LiPF_6$ was dissolved was formed into a sheet of 40 μm. This sheet was interposed between a positive electrode and a negative electrode and an organic electrolyte was then impregnated to produce a lithium secondary battery.

Comparative Example 5

A lithium secondary battery was produced in the same manner as in Example 1 except that a composite electrolyte was composited using $Al_2O_3$ having a primary particle size (average particle diameter) of 0.1 μm.

Figure 11:
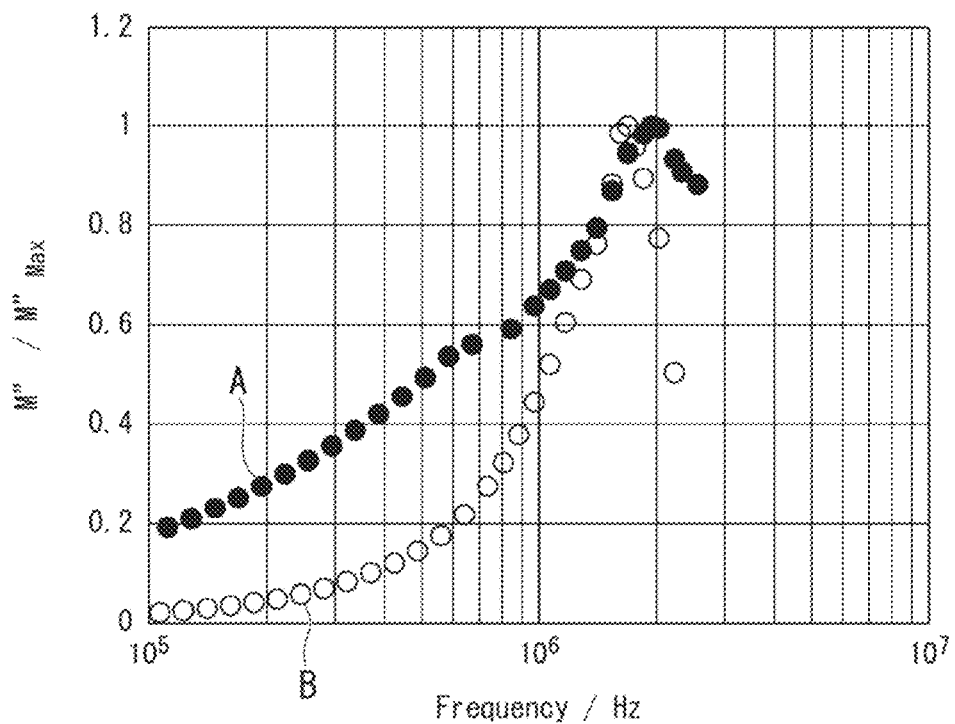
FIG. 11 is a diagram showing modulus spectrums of Example 1 and Comparative Example 4.

Table 1-1 to Table 1-3 show composition ratios, and conductivity and modulus measurement results of the examples and comparative examples. Table 2-1 to Table 2-3 show the performances of the examples and the comparative examples, that is, the capacity retention rates (%) for rate performance at 25° C., and low temperature performance and lifespan characteristics after 50 cycles at 60° C. Here, regarding the measurement of the modulus spectrums of Example 1 and Comparative Example 4, FIG. 11 shows the results of Example 1(A) and Comparative Example 4(B).

All of the examples had excellent performance even when the thickness of the electrolyte was less than 8 μm. That is, comparing Comparative Examples 1 to 4 in which the thickness of the electrolyte was 20 μm or more and having a sintered body or sheet-like electrolyte layer, both the rate performance at 25° C. and the low temperature performance were excellent, and the results of the lifespan characteristics at 60° C. were the same.

In the same manner as in the modulus measurement, ion conductivity at room temperature of the electrolyte layer was measured using an electrolyte interposed between gold electrodes and a Solatron 1260 frequency response analyzer. The charge transfer resistance at room temperature was estimated from the obtained arc. All of the thicknesses and areas of the electrolyte layers to be measured were obtained, and the ion conductivity was obtained by taking the reciprocal of the numerical value obtained by multiplying the obtained values by the resistance value. The conductivities of all of the composite electrolytes in Example 1 and the compositions of the electrolytes are shown Table 3. As can be clearly understood from the results, the composite electrolyte of the present invention had higher conductivity than the solid electrolyte before combination and the organic gel electrolyte alone, and had second highest conductivity next to the liquid electrolyte solution having the highest conductivity.

Figure 12:
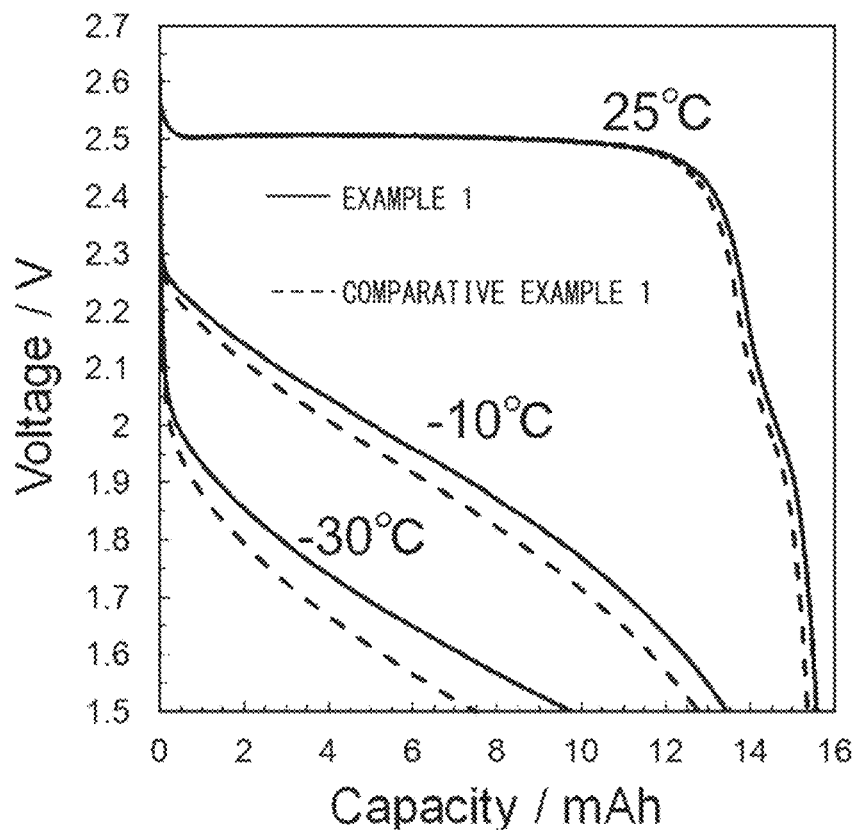
FIG. 12 is a graph showing discharge curves with respect to temperature of single phase cells using electrolytes of Example 1 and Comparative Example 1.
Figure 13:
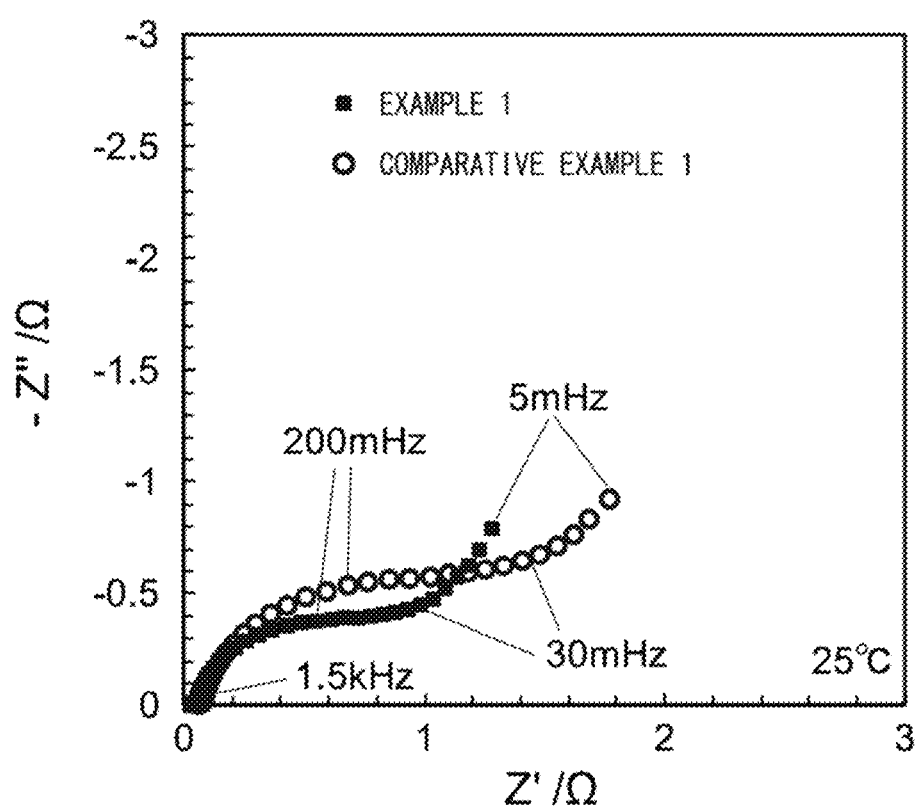
FIG. 13 is a graph showing AC impedance measurement results of single phase cells of Example 1 and Comparative Example 1.
Figure 14:
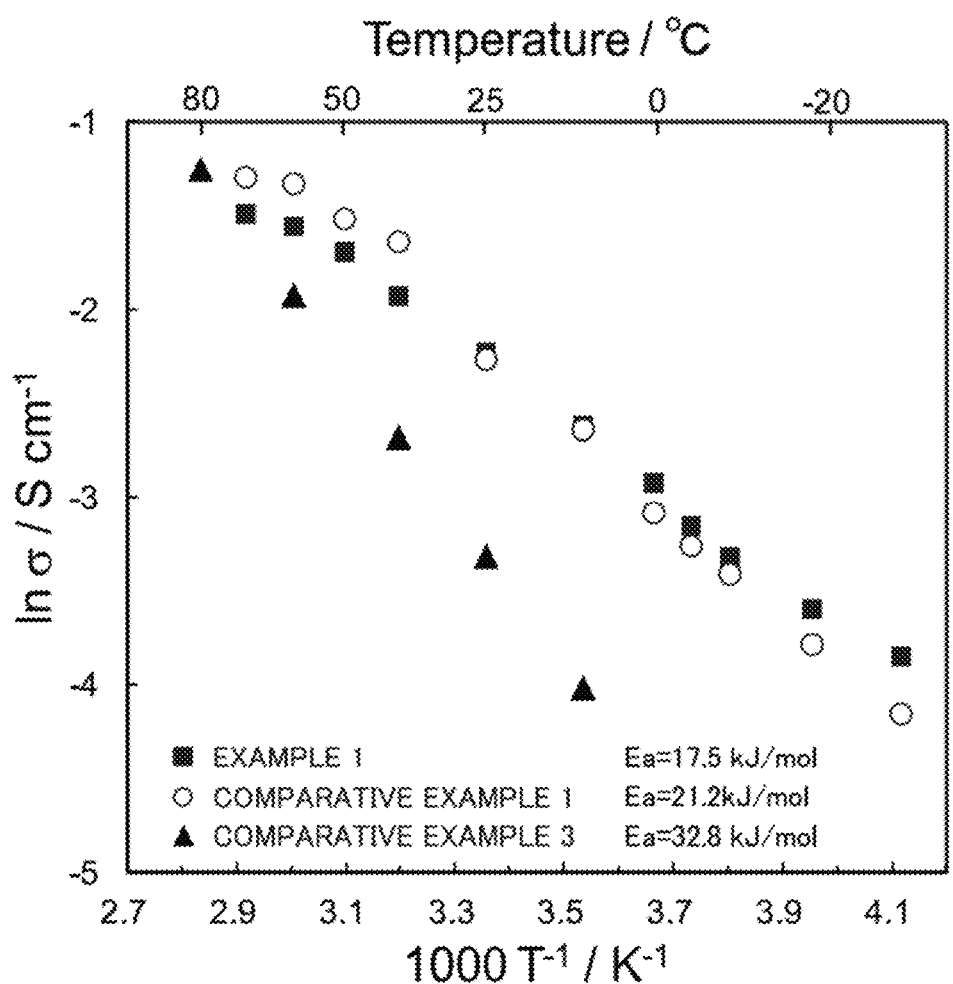
FIG. 14 is a graph showing Arrhenius plots of the ion conductivity a of Example 1 and Comparative Example 1 dependent on the temperature.

In the same manner as in the method of measuring the ion conductivity, the activation energy of the electrolyte layer was measured in a range of −30° C. to 70° C. A graph in which the horizontal axis represents the reciprocal of the temperature and the vertical axis represents the logarithmic value of the obtained ion conductivity at each temperature was plotted, and the activation energy was calculated from the obtained slope. FIG. 12 shows discharge curves with respect to temperature of single phase cells using the electrolytes of Example 1 and Comparative Example 1. As can be clearly understood from the results, the discharge performance at low temperatures was excellent. FIG. 13 shows AC impedance measurement results of the single phase cells. Based on the results, it can be understood that Example 1 had a lower AC impedance component and exhibited easier movement of lithium than Comparative Example 1. In addition, when Arrhenius plots of the ion conductivity a dependent on the temperature were generated (FIG. 14), the results of Example 1 showed the lowest apparent activation energy of lithium ion conductivity that was 17.5 kJ.

Figure 15:
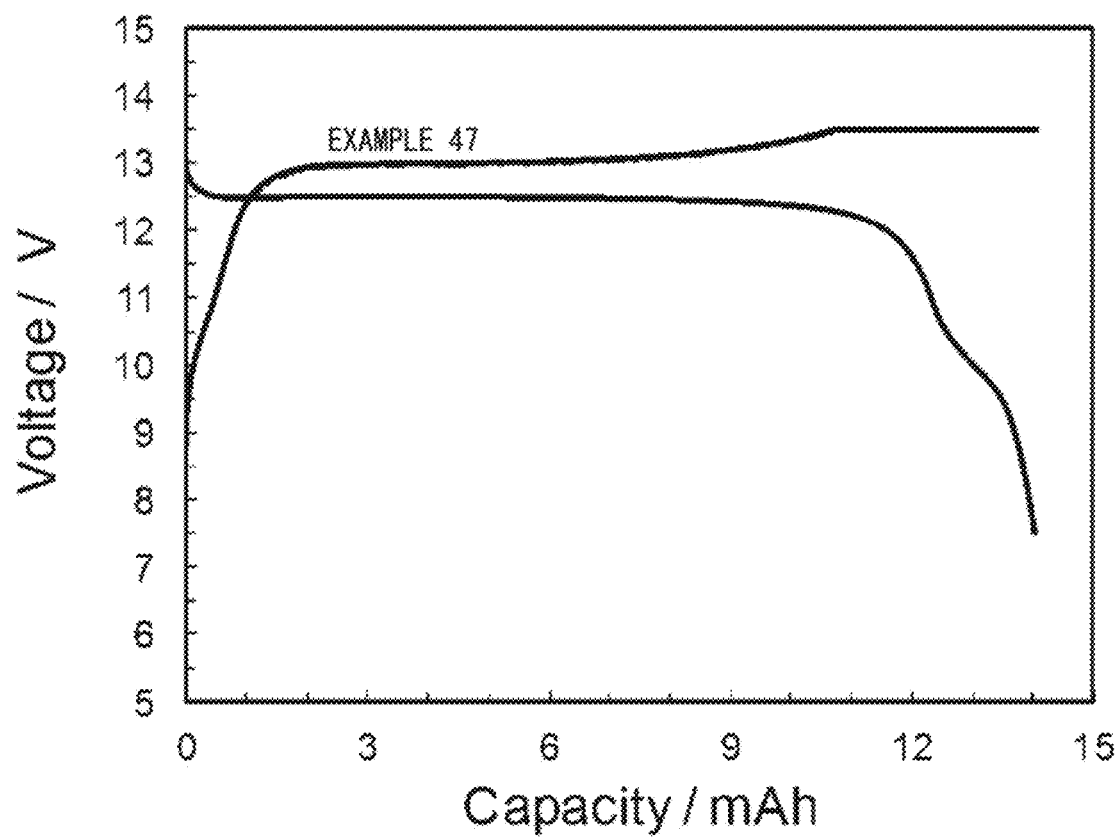
FIG. 15 is a graph showing charging and discharging curves of a 5-layer bipolar cell using a composite electrolyte of Example 47.
Figure 16:
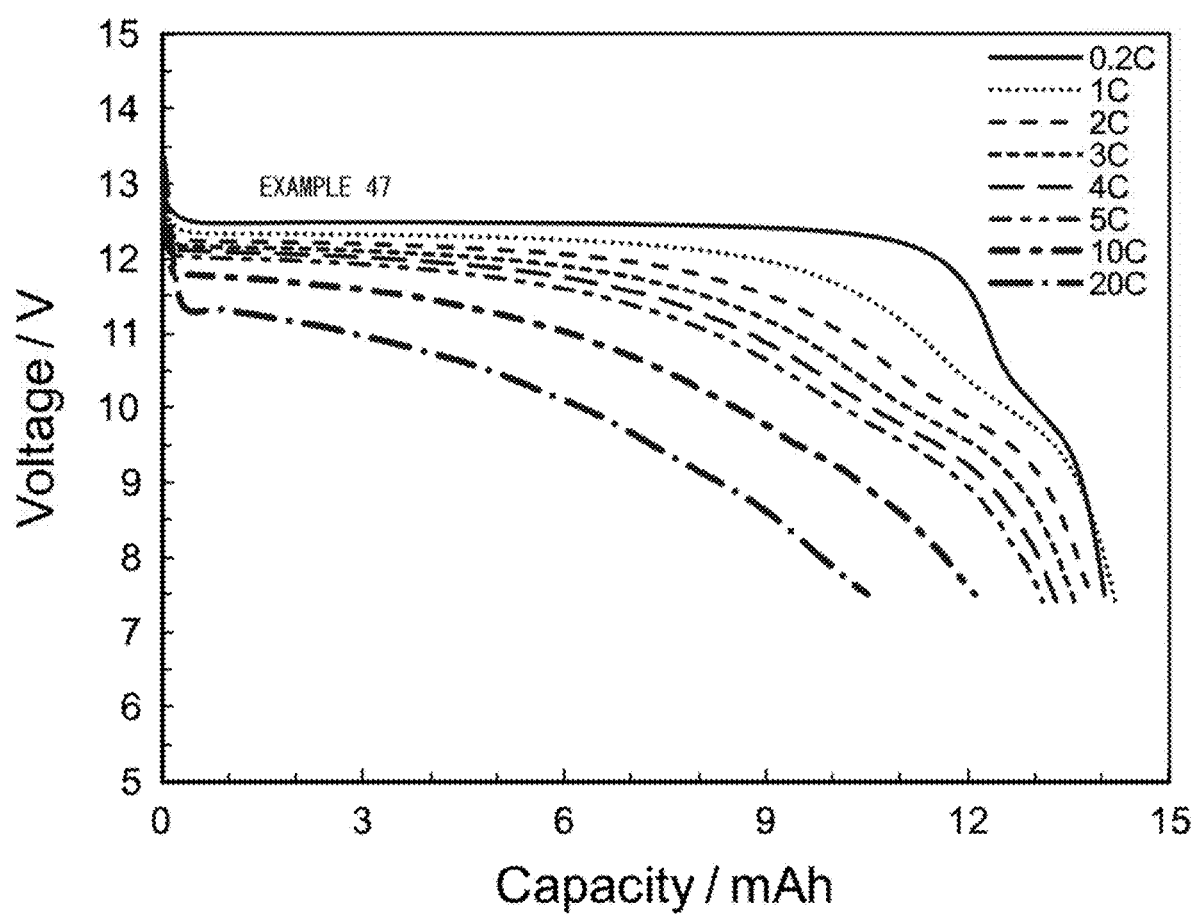
FIG. 16 is a graph showing the transition of discharge curves obtained when the discharge rate of the cell in FIG. 15 is changed.
Figure 17:
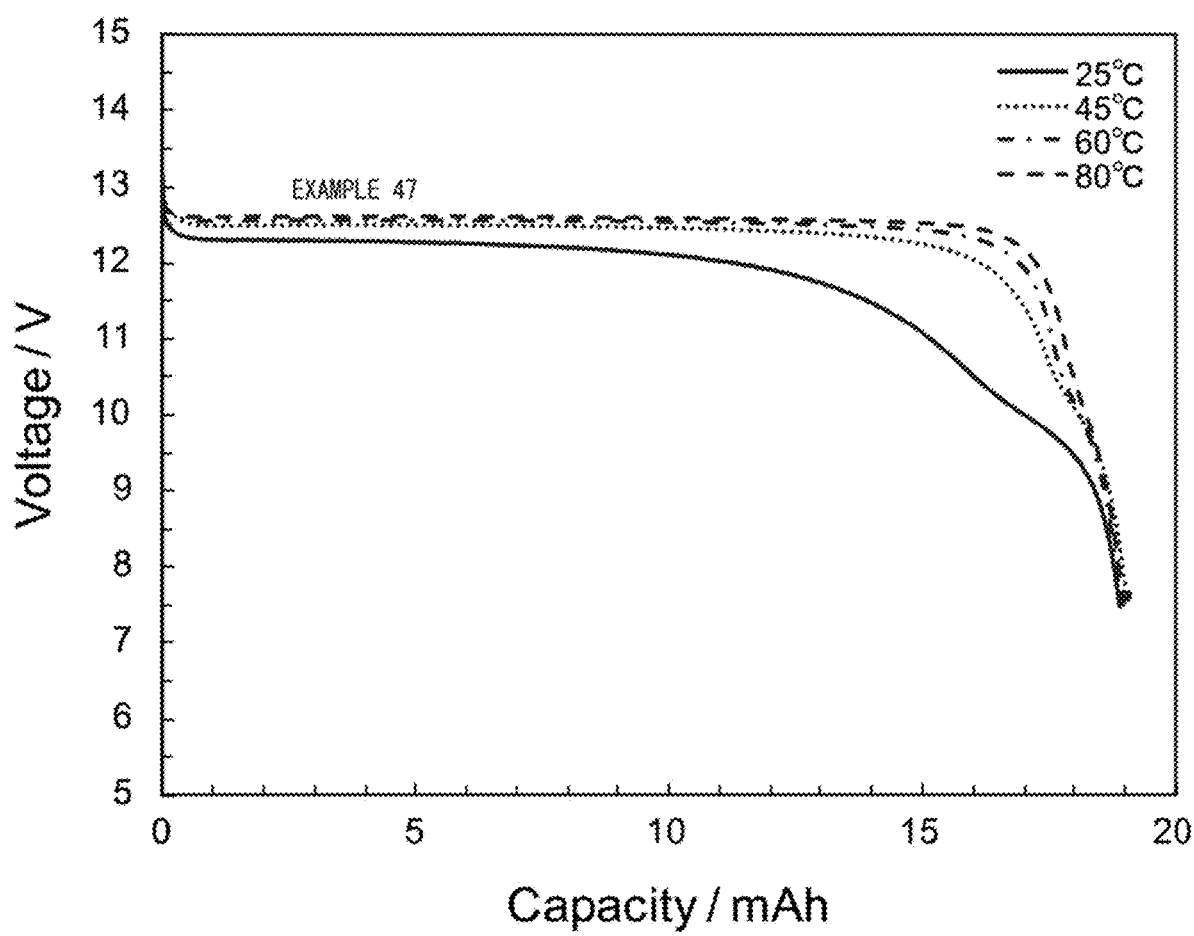
FIG. 17 is a graph showing discharge curves of the cell in FIG. 15 at high temperatures.
Figure 18:
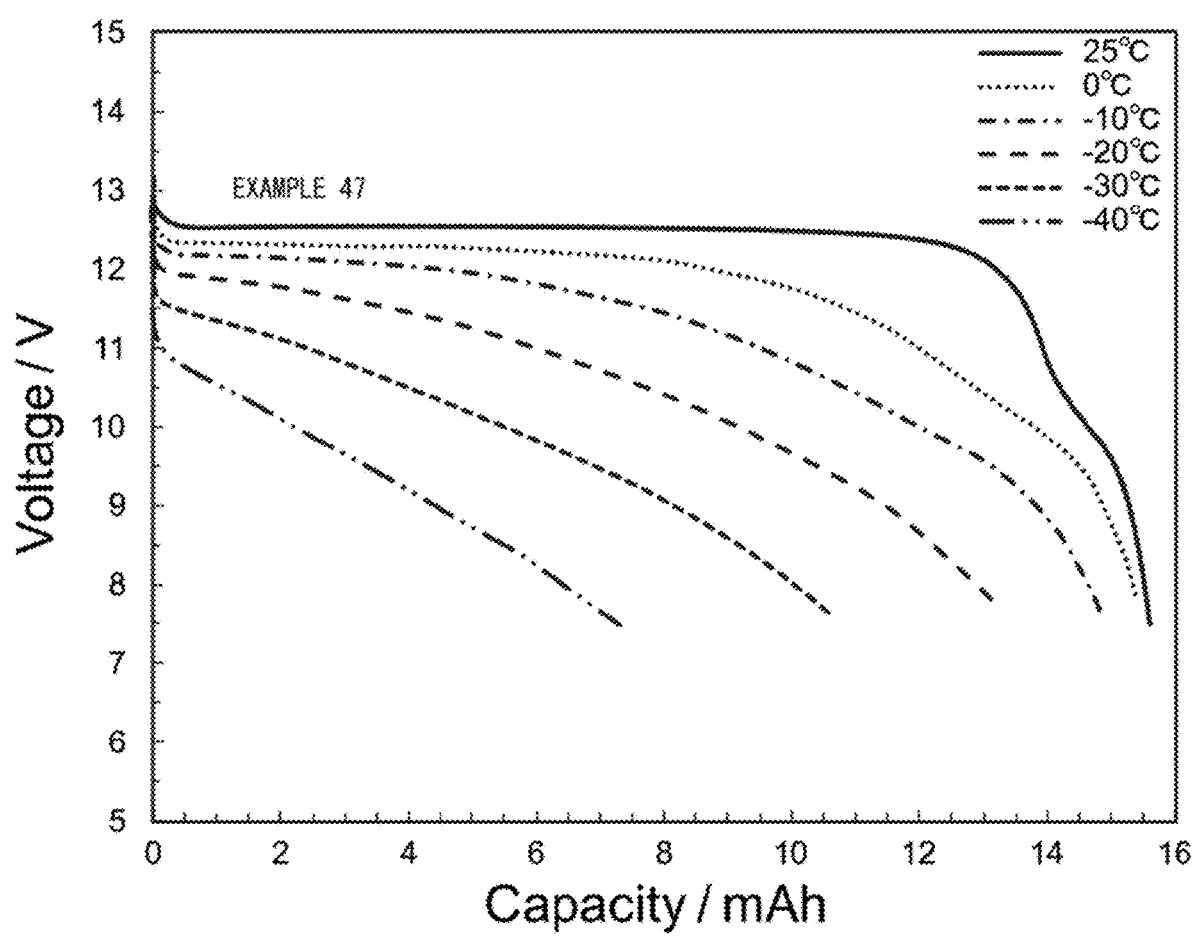
FIG. 18 is a graph showing discharge curves of the cell in FIG. 15 at low temperatures.
Figure 19:
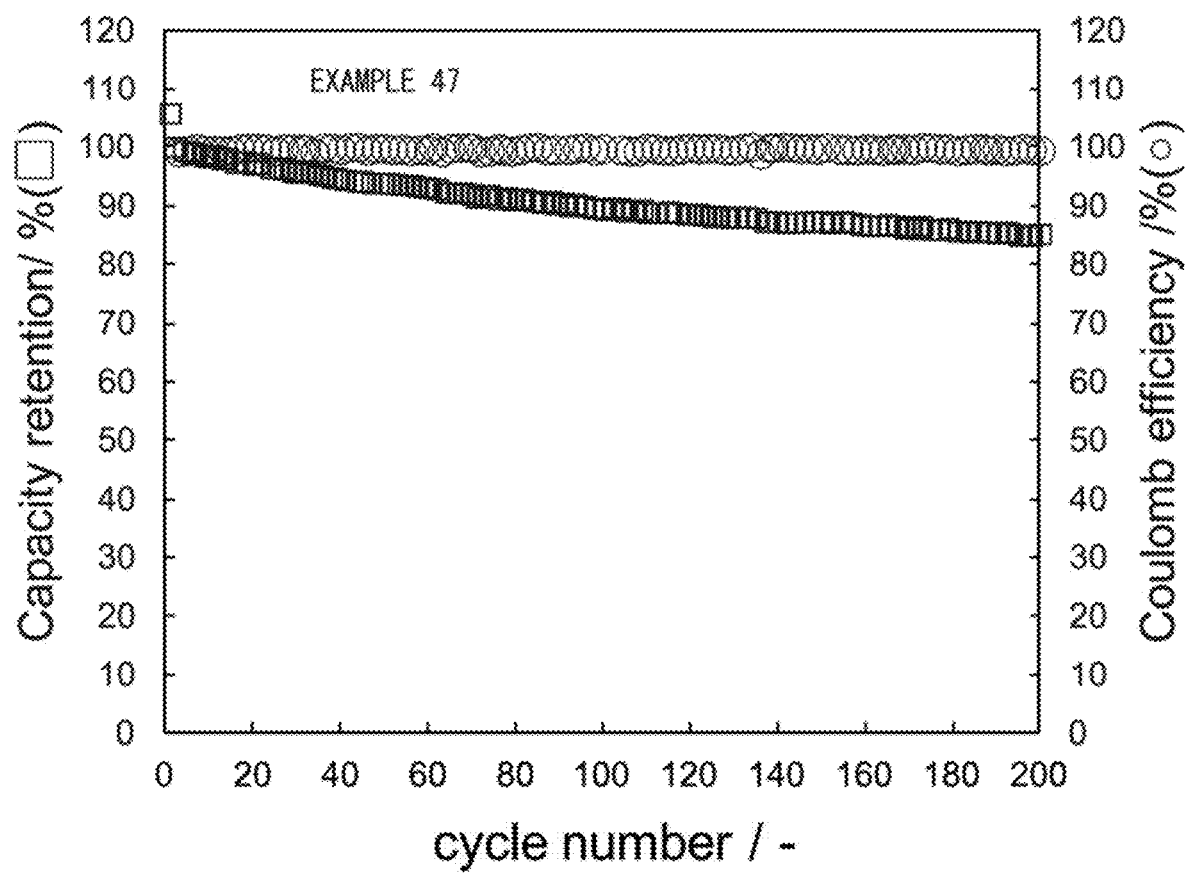
FIG. 19 is a graph showing results of an accelerated lifespan cycle test of the cell in FIG. 15.

FIG. 15 shows charging and discharging curves obtained when a 5-layer bipolar secondary battery using the composite electrolyte of Example 47 was used. In such a combination, it can be understood that an output of 12 V or higher was obtained as an operation voltage of the battery. FIG. 16 shows the transition of discharge curves obtained when a discharge rate was changed. In this manner, a discharge was possible at a high discharge rate of 20 C. FIG. 17 shows discharge curves at high temperatures. FIG. 18 shows discharge curves at low temperatures. In this manner, operation was possible in a wide temperature range of −40° to 80° as a result. FIG. 19 shows results of an accelerated lifespan cycle test at an environment temperature of 60° C. and a current rate of 2 C. In this manner, stable charging and discharging were obtained as a result.

TABLE 1-1

| | Thickness of electrolyte (mm) | Main peak half width | Composition ratio of inorganic/ electrolyte solution/ polymer (wt %) | Average particle diameter (mm) | Specific surface area (m²/g) | Proportion of organic electrolyte in electrode (wt %) | Composition ratio (wt %) of inorganic/ binding material/ organic | Solid electrolyte conductivity at 25° C. (mS/cm) | Electrolyte conductivity at 25° C. (mS/cm) | Electrolyte activation energy (kJ/mol) | Modulus half width/2 Comparative Example 1 was 1 |
|---|---|---|---|---|---|---|---|---|---|---|---|
| Example 1 | 2.0 | 0.80 | 96/3.2/0.8 | 0.10 | 75.4 | 3.0 | 94.3/1.9/3.8 | 0.49 | 5.97 | 17.4 | 2.29 |
| Example 2 | 7.9 | 0.08 | 96/3.2/0.8 | 7.80 | 17.0 | 3.8 | 94.3/1.9/3.8 | 0.48 | 5.63 | 20.1 | 2.21 |
| Example 3 | 7.1 | 0.09 | 96/3.2/0.8 | 5.98 | 18.5 | 3.7 | 94.3/1.9/3.8 | 0.49 | 5.69 | 19.6 | 2.21 |
| Example 4 | 5.4 | 0.10 | 96/3.2/0.8 | 5.11 | 19.4 | 3.7 | 94.3/1.9/3.8 | 0.49 | 5.74 | 19.2 | 2.23 |
| Example 5 | 4.8 | 0.12 | 96/3.2/0.8 | 4.20 | 21.0 | 3.6 | 94.3/1.9/3.8 | 0.48 | 5.82 | 18.9 | 2.23 |
| Example 6 | 3.2 | 0.15 | 96/3.2/0.8 | 3.01 | 22.9 | 3.6 | 94.3/1.9/3.8 | 0.49 | 5.86 | 18.5 | 2.24 |
| Example 7 | 2.1 | 0.19 | 96/3.2/0.8 | 1.80 | 26.7 | 3.5 | 94.3/1.9/3.8 | 0.49 | 5.90 | 18.1 | 2.25 |
| Example 8 | 1.9 | 0.21 | 96/3.2/0.8 | 1.50 | 28.6 | 3.3 | 94.3/1.9/3.8 | 0.47 | 5.91 | 17.8 | 2.24 |
| Example 9 | 2.0 | 0.25 | 96/3.2/0.8 | 1.00 | 32.9 | 3.2 | 94.3/1.9/3.8 | 0.49 | 5.95 | 17.5 | 2.28 |
| Example 10 | 2.0 | 0.29 | 96/3.2/0.8 | 0.80 | 35.4 | 3.1 | 94.3/1.9/3.8 | 0.48 | 5.92 | 17.5 | 2.27 |
| Example 11 | 2.2 | 0.35 | 96/3.2/0.8 | 0.50 | 41.6 | 3.1 | 94.3/1.9/3.8 | 0.49 | 5.95 | 17.4 | 2.29 |
| Example 12 | 2.0 | 0.56 | 96/3.2/0.8 | 0.20 | 55.2 | 3.0 | 94.3/1.9/3.8 | 0.48 | 5.98 | 17.5 | 2.29 |
| Example 13 | 1.9 | 0.61 | 96/3.2/0.8 | 0.18 | 58.1 | 3.0 | 94.3/1.9/3.8 | 0.47 | 5.97 | 17.1 | 2.30 |
| Example 14 | 1.8 | 0.98 | 96/3.2/0.8 | 0.05 | 91.3 | 3.0 | 94.3/1.9/3.8 | 0.49 | 5.98 | 16.8 | 2.30 |
| Example 15 | 7.9 | 0.80 | 96/3.2/0.8 | 0.10 | 75.4 | 3.0 | 94.3/1.9/3.8 | 0.49 | 5.97 | 17.5 | 2.28 |
| Example 16 | 7.7 | 0.80 | 96/3.2/0.8 | 0.10 | 75.4 | 3.0 | 94.3/1.9/3.8 | 0.49 | 5.97 | 17.5 | 2.29 |
| Example 17 | 6.8 | 0.80 | 96/3.2/0.8 | 0.10 | 75.4 | 3.0 | 94.3/1.9/3.8 | 0.49 | 5.97 | 17.4 | 2.27 |
| Example 18 | 6.1 | 0.80 | 96/3.2/0.8 | 0.10 | 75.4 | 3.0 | 94.3/1.9/3.8 | 0.49 | 5.97 | 17.4 | 2.29 |
| Example 19 | 5.1 | 0.80 | 96/3.2/0.8 | 0.10 | 75.4 | 3.0 | 94.3/1.9/3.8 | 0.49 | 5.97 | 17.5 | 2.29 |
| Example 2017.52.28 | 4.9 | 0.80 | 96/3.2/0.8 | 0.10 | 75.4 | 3.0 | 94.3/1.9/3.8 | 0.49 | 5.97 | 17.5 | 2.28 |
| Example 21 | 4.0 | 0.80 | 96/3.2/0.8 | 0.10 | 75.4 | 3.0 | 94.3/1.9/3.8 | 0.49 | 5.97 | 17.5 | 2.29 |
| Example 22 | 3.2 | 0.80 | 96/3.2/0.8 | 0.10 | 75.4 | 3.0 | 94.3/1.9/3.8 | 0.49 | 5.97 | 17.4 | 2.28 |
| Example 23 | 1.3 | 0.80 | 96/3.2/0.8 | 0.10 | 75.4 | 3.0 | 94.3/1.9/3.8 | 0.49 | 5.97 | 17.5 | 2.27 |
| Example 24 | 0.6 | 0.80 | 96/3.2/0.8 | 0.10 | 75.4 | 3.0 | 94.3/1.9/3.8 | 0.49 | 5.97 | 17.5 | 2.29 |

TABLE 1-2

| | Thickness of electrolyte (mm) | Main peak half width | Composition ratio of inorganic/ electrolyte solution/ polymer (wt %) | Average particle diameter (mm) | Specific surface area (m²/g) | Proportion of organic electrolyte in electrode (wt %) | Composition ratio (wt %) of inorganic/ binding material/ organic | Solid electrolyte conductivity at 25° C. (mS/cm) | Electrolyte conductivity at 25° C. (mS/cm) | Electrolyte activation energy (kJ/mol) | Modulus half width/2 Comparative Example 1 was 1 |
|---|---|---|---|---|---|---|---|---|---|---|---|
| Example 25 | 2.0 | 0.80 | 96/3.2/0.8 | 0.10 | 75.4 | 25.0 | 94.3/1.9/3.8 | 0.49 | 5.97 | 17.5 | 2.29 |
| Example 26 | 2.0 | 0.80 | 96/3.2/0.8 | 0.10 | 75.4 | 20.0 | 94.3/1.9/3.8 | 0.49 | 5.97 | 17.5 | 2.28 |
| Example 27 | 2.0 | 0.80 | 96/3.2/0.8 | 0.10 | 75.4 | 15.0 | 94.3/1.9/3.8 | 0.49 | 5.97 | 17.5 | 2.29 |
| Example 28 | 2.0 | 0.80 | 96/3.2/0.8 | 0.10 | 75.4 | 10.0 | 94.3/1.9/3.8 | 0.49 | 5.97 | 17.5 | 2.28 |
| Example 29 | 2.0 | 0.80 | 96/3.2/0.8 | 0.10 | 75.4 | 5.0 | 94.3/1.9/3.8 | 0.49 | 5.97 | 17.5 | 2.29 |
| Example 30 | 2.0 | 0.80 | 96/3.2/0.8 | 0.10 | 75.4 | 1.0 | 94.3/1.9/3.8 | 0.49 | 5.97 | 17.5 | 2.29 |
| Example 31 | 2.0 | 0.80 | 96/3.2/0.8 | 0.10 | 75.4 | 0.1 | 94.3/1.9/3.8 | 0.49 | 5.97 | 17.5 | 2.29 |
| Example 32 | 2.0 | 0.80 | 96/3.5/0.5 | 0.10 | 75.4 | 3.0 | 94.3/1.9/3.8 | 0.49 | 6.21 | 16.3 | 2.35 |
| Example 33 | 2.0 | 0.80 | 96/3.0/1.0 | 0.10 | 75.4 | 3.0 | 94.3/1.9/3.8 | 0.49 | 5.66 | 18.0 | 2.29 |
| Example 34 | 2.0 | 0.80 | 96/2.5/1.5 | 0.10 | 75.4 | 3.0 | 94.3/1.9/3.8 | 0.49 | 5.28 | 18.9 | 2.25 |
| Example 35 | 2.0 | 0.80 | 96/2.0/2.0 | 0.10 | 75.4 | 3.0 | 94.3/1.9/3.8 | 0.49 | 4.11 | 20.4 | 2.20 |
| Example 36 | 2.0 | 0.80 | 96/1.5/2.5 | 0.10 | 75.4 | 3.0 | 94.3/1.9/3.8 | 0.49 | 3.56 | 24.7 | 2.21 |
| Example 37 | 2.0 | 0.80 | 96/1.0/3.0 | 0.10 | 75.4 | 3.0 | 94.3/1.9/3.8 | 0.49 | 2.38 | 26.8 | 2.09 |
| Example 38 | 2.0 | 0.80 | 96/0.5/3.5 | 0.10 | 75.4 | 3.0 | 94.3/1.9/3.8 | 0.49 | 0.89 | 29.1 | 1.99 |
| Example 39 | 2.0 | 0.80 | 96/3.2/0.8 | 0.10 | 75.4 | 3.0 | 94.3/0.1/5.6 | 0.49 | 6.04 | 17.2 | 2.29 |
| Example 40 | 2.0 | 0.80 | 96/3.2/0.8 | 0.10 | 75.4 | 3.0 | 94.3/0.5/5.2 | 0.49 | 6.01 | 17.4 | 2.28 |
| Example 41 | 2.0 | 0.80 | 96/3.2/0.8 | 0.10 | 75.4 | 3.0 | 94.3/2.9/2.9 | 0.49 | 3.89 | 20.5 | 2.29 |
| Example 42 | 2.0 | 0.80 | 96/3.2/0.8 | 0.10 | 75.4 | 3.0 | 94.3/5.6/0.1 | 0.49 | 0.61 | 27.6 | 2.29 |
| Example 43 | 2.0 | 0.80 | 96/3.2/0.8 | 0.10 | 75.2 | 3.0 | 94.3/1.9/3.8 | 0.29 | 5.92 | 18.1 | 2.25 |
| Example 44 | 2.0 | 0.80 | 96/3.2/0.8 | 0.10 | 75.1 | 3.0 | 94.3/1.9/3.8 | 1.10 | 6.12 | 18.5 | 2.55 |
| Example 45 | 2.0 | 0.80 | 96/3.2/0.8 | 0.10 | 75.6 | 3.0 | 94.3/1.9/3.8 | 0.50*10−2 | 5.87 | 19.0 | 1.78 |

TABLE 1-2-continued

| | Thickness of electrolyte (mm) | Main peak half width | Composition ratio of inorganic/ electrolyte solution/ polymer (wt %) | Average particle diameter (mm) | Specific surface area (m²/g) | Proportion of organic electrolyte in electrode (wt %) | Composition ratio (wt %) of inorganic/ binding material/ organic | Solid electrolyte conductivity at 25° C. (mS/cm) | Electrolyte conductivity at 25° C. (mS/cm) | Electrolyte activation energy (kJ/mol) | Modulus half width/2 Comparative Example 1 was 1 |
|---|---|---|---|---|---|---|---|---|---|---|---|
| Example 46 | 2.0 | 0.80 | 96/3.2/0.8 | 0.10 | 75.5 | 3.0 | 94.3/1.9/3.8 | 0.33*10−2 | 5.73 | 19.2 | 1.63 |
| Example 47 | 2.0 | 0.80 | 96/3.2/0.8 | 0.10 | 75.4 | 3.0 | 94.3/1.9/3.8 | 0.49 | 5.97 | 17.4 | 2.25 |

TABLE 1-3

| | Thickness of electrolyte (mm) | Main peak half width | Composition ratio of inorganic/ electrolyte solution/ polymer (wt %) | Average particle diameter (mm) | Specific surface area (m²/g) | Proportion of organic electrolyte in electrode (wt %) | Composition ratio (wt %) of inorganic/ binding material/ organic | Solid electrolyte conductivity at 25° C. (mS/cm) | Electrolyte conductivity at 25° C. (mS/cm) | Electrolyte activation energy (kJ/mol) | Modulus half width/2 Comparative Example 1 was 1 |
|---|---|---|---|---|---|---|---|---|---|---|---|
| Comparative Example 1 | 20.0 | — | 0/80/20 | — | — | 3.0 | — | — | 6.69 | 8.6 | 0.99 |
| Comparative Example 2 | 20.0 | — | 0/80/20 | — | — | 3.0 | — | — | 6.67 | 8.7 | 0.98 |
| Comparative Example 3 | 20.0 | 0.25 | 100/0/0 | 1.00 | 32.5 | 0.0 | — | 0.47 | 0.47 | 32.8 | 0.86 |
| Comparative Example 4 | 40.0 | — | 0/80/20 | — | — | 3.0 | — | 5.51 | 5.51 | 21.2 | 1.00 |
| Comparative Example 5 | 2.0 | — | 96/3.2/0.8 | 0.10 | 75.1 | 3.0 | 94.3/1.9/3.8 | — | 5.65 | 19.6 | 1.59 |

TABLE 2-1

| | Capacity retention rate (%) for rate performance 1 C/20 C at 25° C. | Capacity retention rate (%) for low temperature performance at −30° C./25° C. | Capacity retention rate (%) for lifespan characteristics after 50 cycles at 60° C. |
|---|---|---|---|
| Example 1 | 76.0 | 70.9 | 95 |
| Example 2 | 71.2 | 65.9 | 96 |
| Example 3 | 72.5 | 65.4 | 94 |
| Example 4 | 74.6 | 66.3 | 93 |
| Example 5 | 74.9 | 67.2 | 92 |
| Example 6 | 75.2 | 67.4 | 95 |
| Example 7 | 76.1 | 67.9 | 90 |
| Example 8 | 75.8 | 69.0 | 94 |
| Example 9 | 76.3 | 69.6 | 93 |
| Example 10 | 76.1 | 69.7 | 92 |
| Example 11 | 76.0 | 69.1 | 95 |
| Example 12 | 76.8 | 70.5 | 95 |
| Example 13 | 75.9 | 70.9 | 92 |
| Example 14 | 76.2 | 70.2 | 91 |
| Example 15 | 72.0 | 65.8 | 94 |
| Example 16 | 72.8 | 66.2 | 95 |
| Example 17 | 73.9 | 67.0 | 94 |
| Example 18 | 74.1 | 66.8 | 93 |
| Example 19 | 74.5 | 68.5 | 94 |
| Example 20 | 74.9 | 67.9 | 94 |
| Example 21 | 75.5 | 68.8 | 95 |
| Example 22 | 76.0 | 70.1 | 95 |
| Example 23 | 77.3 | 71.1 | 94 |
| Example 24 | 77.8 | 70.5 | 95 |

TABLE 2-2

| | Capacity retention rate (%) for rate performance 1 C/20 C at 25° C. | Capacity retention rate (%) for low temperature performance at −30° C./25° C. | Capacity retention rate (%) for lifespan characteristics after 50 cycles at 60° C. |
|---|---|---|---|
| Example 25 | 77.2 | 71.5 | 95 |
| Example 26 | 77.0 | 70.3 | 94 |
| Example 27 | 76.0 | 69.9 | 95 |
| Example 28 | 76.5 | 70.2 | 95 |
| Example 29 | 76.7 | 70.5 | 94 |
| Example 30 | 75.1 | 65.9 | 92 |
| Example 31 | 70.3 | 62.5 | 91 |
| Example 32 | 76.5 | 70.9 | 94 |
| Example 33 | 76.7 | 70.4 | 95 |
| Example 34 | 75.3 | 68.9 | 93 |
| Example 35 | 74.9 | 66.3 | 94 |
| Example 36 | 73.0 | 64.8 | 94 |
| Example 37 | 71.5 | 62.7 | 93 |
| Example 38 | 68.8 | 61.9 | 93 |
| Example 39 | 76.8 | 68.5 | 94 |
| Example 40 | 77.0 | 69.8 | 94 |
| Example 41 | 76.9 | 67.7 | 95 |
| Example 42 | 76.5 | 67.2 | 94 |
| Example 43 | 76.4 | 69.8 | 94 |
| Example 44 | 77.7 | 69.5 | 94 |
| Example 45 | 73.6 | 68.6 | 94 |
| Example 46 | 73.1 | 68.1 | 93 |
| Example 47 | 75.0 | 70.8 | 93 |

TABLE 2-3

| | Capacity retention rate (%) for rate performance 1 C/20 C at 25° C. | Capacity retention rate (%) for low temperature performance at −30° C./25° C. | Capacity retention rate (%) for lifespan characteristics after 50 cycles at 60° C. |
|---|---|---|---|
| Comparative Example 1 | 52.3 | 49.9 | 91 |

TABLE 2-3-continued

| | Capacity retention rate (%) for rate performance 1 C/20 C at 25° C. | Capacity retention rate (%) for low temperature performance at −30° C./25° C. | Capacity retention rate (%) for lifespan characteristics after 50 cycles at 60° C. |
|---|---|---|---|
| Comparative Example 2 | 51.8 | 48.9 | 92 |
| Comparative Example 3 | 0.0 | 0.0 | 0 |
| Comparative Example 4 | 47.1 | 41.6 | 94 |
| Comparative Example 5 | 62.7 | 65.5 | 93 |

TABLE 3

| Electrolyte | LLZ (wt %) | PAN (wt %) | LiPF$_6$ (wt %) | PC (wt %) | DEC (wt %) | Conductivity (mS Cm$^{-1}$) at 25° C. |
|---|---|---|---|---|---|---|
| Liquid electrolyte | — | — | 18.2 | 25.3 | 54.5 | 6.69 |
| PAN-based gel polymer electrolyte | — | 20 | 14.6 | 20.2 | 43.6 | 5.51 |
| LLZ-based hybrid electrolyte | 96 | 0.8 | 0.6 | 0.8 | 1.7 | 5.97 |
| LLZ solid electrolyte in Ref[22] | 100 | — | — | — | — | 0.49 |

While several embodiments of the present invention have been described, these embodiments are only examples and are not intended to limit the scope of the invention. These embodiments can be implemented in various other forms, and various omissions, substitutions, and changes can be made without departing from the spirit and scope of the invention. These embodiments and modifications thereof are included in the spirit and scope of the invention, and fall within the inventions described in the appended claims and equivalents thereof.

What is claimed is:

1. A secondary battery, comprising:
a positive electrode;
a negative electrode comprising negative electrode active material particles that insert and extract Li ions; and
an electrolyte layer that is arranged between the positive electrode and the negative electrode,
wherein the electrolyte layer is formed of a secondary battery composite electrolyte that is a gel-like polymer electrolyte and that comprises inorganic solid particles comprising an inorganic compound having an Li ion conductivity of 1×10$^{-10}$ S/cm or more at 25° C. and having an average particle diameter of 0.05 μm or more and less than 8 μm and an organic electrolyte,
wherein the weight ratio between the organic electrolyte and the inorganic compound is 0.1% or more and 20% or less,
wherein, when a mobile Li ion concentration at a contact interface between the inorganic compound and the organic electrolyte is set as $C_{Li(surface)}$, a mobile lithium ion concentration at the center of the inorganic solid particles is set as $C_{Li(bulk)}$, and an Li ion concentration in the organic electrolyte is set as $C_{Li(organic)}$, $C_{Li(surface)} > C_{Li(organic)} \geq C_{Li(bulk)}$ is satisfied, and
wherein the average thickness of the electrolyte layer is 0.1 μm or more and less than 8 μm, and
wherein the electrolyte layer, and the positive electrode and the negative electrode are formed such that the surface of the electrolyte layer is in close contact with the surfaces of the positive electrode and the negative electrode along unevennesses thereof.

2. The secondary battery according to claim 1,
wherein, in a complex modulus spectrum in which an imaginary part of a complex modulus represented by the following Equation (1) is plotted against a common logarithm of a measurement frequency, when the peak frequency is set as $\omega_{max}$, the relationship between $\omega_{max-hybrid}$ of the secondary battery composite electrolyte, $\omega_{max-inorganic}$ of the inorganic compound included in the secondary battery composite electrolyte, and $\omega_{max-organic}$ of the organic electrolyte included in the secondary battery composite electrolyte satisfies $\omega_{max-hybrid} > \omega_{max-organic}$, $$\hat{M}(\omega) = i\omega \in_0 \hat{Z}(\omega)/k \quad (1) \qquad [\text{Math. 1}]$$

where, i denotes a complex number, ω denotes an angular frequency, $\in_0$ denotes a vacuum dielectric constant, Z(ω) denotes a complex impedance, and k denotes a cell constant obtained by dividing the thickness of an electrolyte layer by an area.

3. The secondary battery according to claim 2,
wherein, regarding a value d of ½ of the half width that is able to be measured from a peak of the modulus spectrum, when the value d in the composite electrolyte is set as $d_{hybrid}$, and the value d in the organic electrolyte included in the composite electrolyte is set as $d_{organic}$, if $d_{organic}$ is 1, $d_{hybrid}$ is greater than 1.

4. The secondary battery according to claim 1,
wherein, for measurement according to an X-ray diffraction method using a Cu—Kα radiation source, the half width of the single highest intensity peak is 2θ=0.05 deg or more and less than 1.00 deg.

5. The secondary battery according to claim 1,
wherein the secondary battery composite electrolyte comprises PVdF as a separate binder component which is less than 20 mass % as a binder with respect to the total mass of the secondary battery composite electrolyte.

6. The secondary battery according to claim 1,
wherein the negative electrode comprises a negative electrode active material containing Ti.

7. The secondary battery according to claim 1,
wherein the secondary battery has a bipolar electrode structure in which, when a structure in which a positive electrode and a negative electrode are alternately laminated with the electrolyte layer interposed therebetween is set as one set, two or more sets are included.

8. A battery pack, comprising the secondary battery according to claim 1.

9. A vehicle, comprising a battery pack according to claim 8.

10. The secondary battery according to claim 1,
wherein the average thickness of the electrolyte layer is 0.5 μm or more and 5 μm or less.

* * * * *